(12) United States Patent
Sanuki et al.

(10) Patent No.: US 12,204,765 B2
(45) Date of Patent: Jan. 21, 2025

(54) MEMORY SYSTEM

(71) Applicant: Kioxia Corporation, Tokyo (JP)

(72) Inventors: Tomoya Sanuki, Mie (JP); Toshio Fujisawa, Kanagawa (JP); Keisuke Nakatsuka, Hyogo (JP)

(73) Assignee: Kioxia Corporation, Tokyo (JP)

( * ) Notice: Subject to any disclaimer, the term of this patent is extended or adjusted under 35 U.S.C. 154(b) by 38 days.

(21) Appl. No.: 18/181,824

(22) Filed: Mar. 10, 2023

(65) Prior Publication Data

US 2024/0086077 A1  Mar. 14, 2024

(30) Foreign Application Priority Data

Sep. 8, 2022  (JP) ................. 2022-143180

(51) Int. Cl.
*G06F 12/00* (2006.01)
*G06F 3/06* (2006.01)

(52) U.S. Cl.
CPC .......... *G06F 3/0619* (2013.01); *G06F 3/0659* (2013.01); *G06F 3/0679* (2013.01)

(58) Field of Classification Search
None
See application file for complete search history.

(56) References Cited

U.S. PATENT DOCUMENTS

| | | | |
|---|---|---|---|
| 10,649,844 B2 | 5/2020 | Ide et al. | |
| 11,211,950 B2 | 12/2021 | Hyodo et al. | |
| 2018/0253347 A1 | 9/2018 | Shigeta et al. | |
| 2020/0019460 A1* | 1/2020 | Cadloni | G06F 3/0679 |
| 2020/0310909 A1* | 10/2020 | Lee | G11C 11/409 |

FOREIGN PATENT DOCUMENTS

| | | |
|---|---|---|
| JP | 2018-160065 A | 10/2018 |
| JP | 2021-111826 A | 8/2021 |

* cited by examiner

*Primary Examiner* — Daniel D Tsui
(74) *Attorney, Agent, or Firm* — Maier & Maier, PLLC

(57) ABSTRACT

According to one embodiment, a memory system includes a nonvolatile semiconductor storage device and a memory controller. The nonvolatile semiconductor storage device includes at least one memory device including a plurality of memory cells corresponding to a plurality of pages. The memory controller is configured to control the nonvolatile semiconductor storage device. The pages include a first page. The memory controller is configured to: read first data stored in the first page from the nonvolatile semiconductor storage device; correct a fail bit included in the read first data; generate first spare data including information on the fail bit corrected in the read first data; and store the first spare data in the nonvolatile semiconductor storage device.

19 Claims, 25 Drawing Sheets

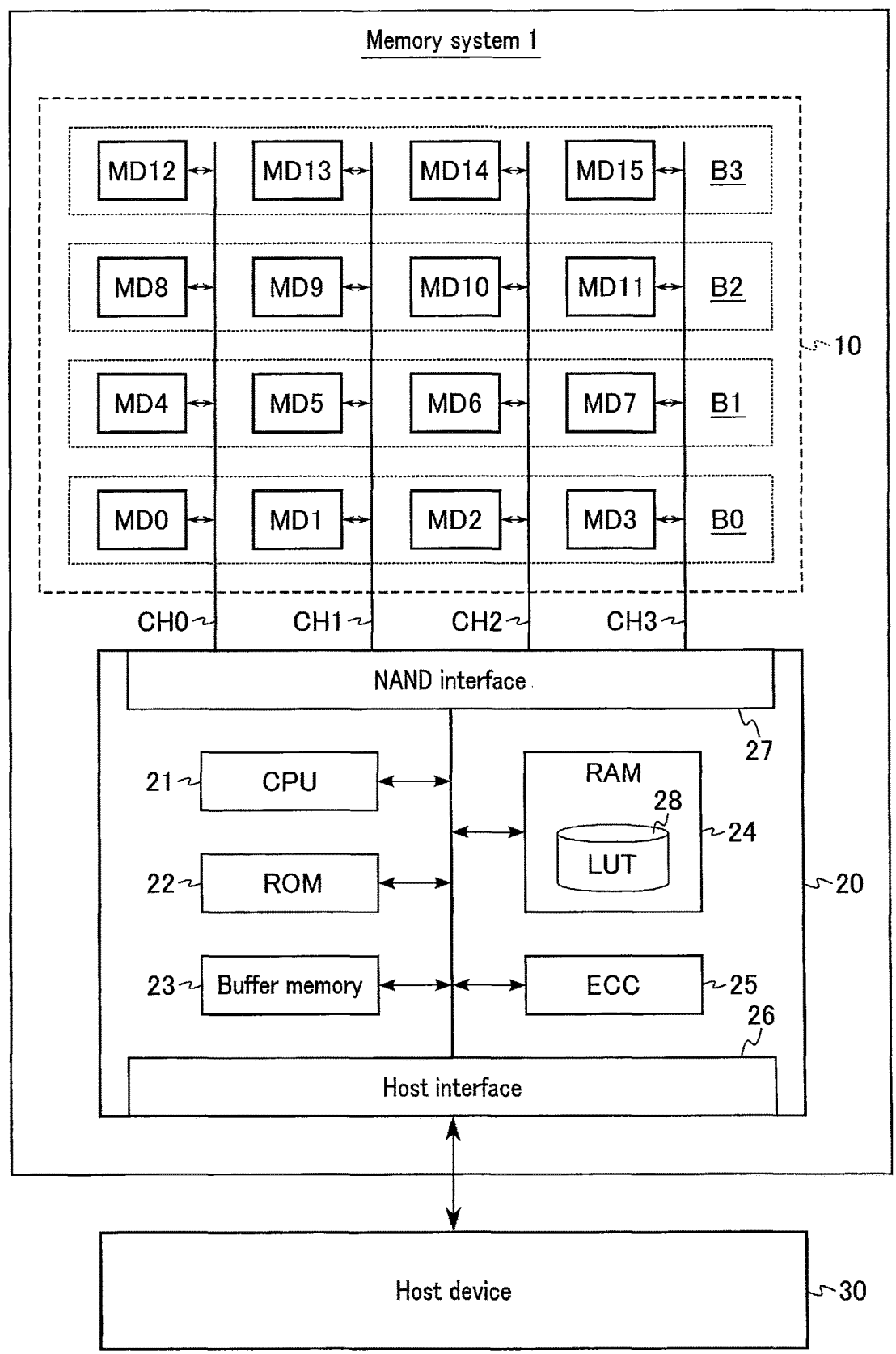
F I G. 1

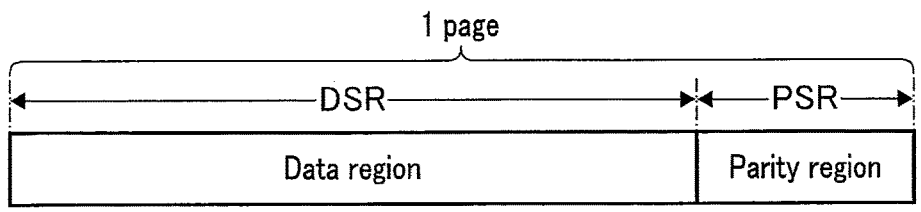
FIG. 5
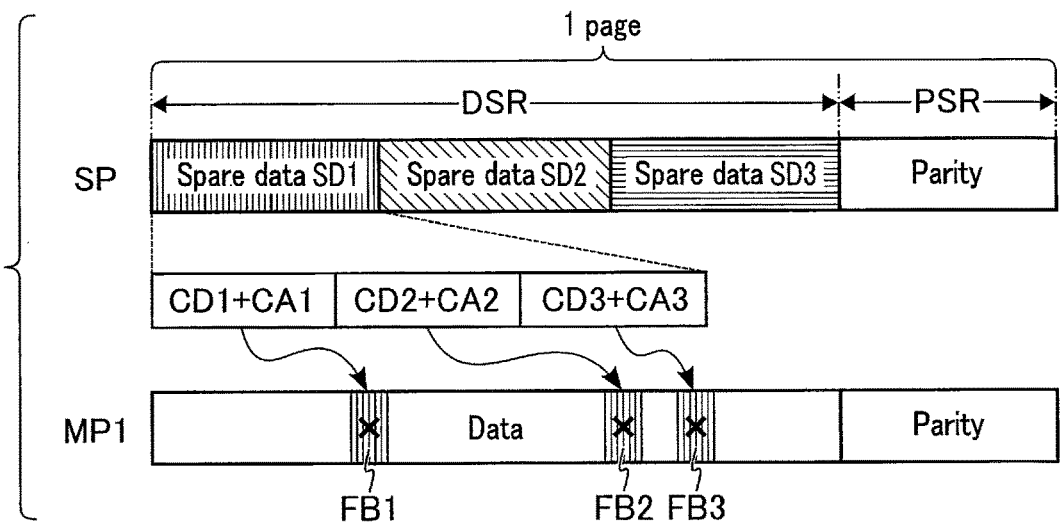
FIG. 6
| ID | Valid | LBA | Chip address | Block address | Page address | Column address | Use spare | Spare ID |
|---|---|---|---|---|---|---|---|---|
| 0 | × | zz | zz | zz | zz | zz | – | – |
| 1 | ○ | zz | zz | zz | zz | zz | – | – |
| 2 | ○ | 100 | zz | zz | zz | zz | ○ | 55 |
| 3 | ○ | zz | zz | zz | zz | zz | – | – |
| ⋮ | ⋮ | ⋮ | ⋮ | ⋮ | ⋮ | ⋮ | ⋮ | ⋮ |
| 55 | ○ | 100 | zz | zz | zz | zz | – | – |
| ⋮ | ⋮ | ⋮ | ⋮ | ⋮ | ⋮ | ⋮ | ⋮ | ⋮ |
FIG. 7

(1) Before generation of spare data SD

| ID | Valid | LBA | Chip address | Block address | Page address | Column address | Use spare | Spare ID |
|---|---|---|---|---|---|---|---|---|
| ⋮ | ⋮ | ⋮ | ⋮ | | ⋮ | ⋮ | · | ⋮ |
| 2 | ○ | 100 | MD0 | BLK1 | PA1 | CAxx | – | – |
| ⋮ | ⋮ | ⋮ | ⋮ | | ⋮ | ⋮ | ⋮ | ⋮ |
| 55 | – | – | – | – | – | – | – | – |
| ⋮ | ⋮ | ⋮ | ⋮ | · | | ⋮ | ⋮ | ⋮ |

S133, S134

(2) After generation of spare data SD

| ID | Valid | LBA | Chip address | Block address | Page address | Column address | Use spare | Spare ID |
|---|---|---|---|---|---|---|---|---|
| ⋮ | ⋮ | ⋮ | ⋮ | ⋮ | ⋮ | ⋮ | ⋮ | ⋮ |
| 2 | ○ | 100 | MD0 | BLK1 | PA1 | CAxx | ○ | 55 |
| ⋮ | ⋮ | ⋮ | ⋮ | ⋮ | ⋮ | ⋮ | | ⋮ |
| 55 | ○ | 100 | MD1 | BLK2 | PA4 | CAyy | – | – |
| ⋮ | ⋮ | | ⋮ | | ⋮ | ⋮ | ⋮ | |

(1) Before refresh operation

| ID | Valid | LBA | Chip address | Block address | Page address | Column address | Use spare | Spare ID |
|----|-------|-----|--------------|---------------|--------------|----------------|-----------|----------|
| ⋮ | ⋮ | | ⋮ | ⋮ | | ⋮ | ⋮ | ⋮ |
| 2 | ○ | 100 | MD0 | BLK1 | PA1 | CAxx | ○ | 55 |
| ⋮ | ⋮ | ⋮ | ⋮ | ⋮ | ⋮ | ⋮ | ⋮ | ⋮ |
| 55 | ○ | 100 | MD1 | BLK2 | PA4 | CAyy | - | - |
| ⋮ | ⋮ | ⋮ | ⋮ | ⋮ | ⋮ | ⋮ | ⋮ | ⋮ |
| 70 | - | - | - | - | - | - | - | - |
| ⋮ | ⋮ | ⋮ | ⋮ | ⋮ | ⋮ | ⋮ | ⋮ | ⋮ |

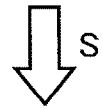

S143, S144

(2) After refresh operation

| ID | Valid | LBA | Chip address | Block address | Page address | Column address | Use spare | Spare ID |
|----|-------|-----|--------------|---------------|--------------|----------------|-----------|----------|
| | ⋮ | ⋮ | ⋮ | | ⋮ | ⋮ | ⋮ | |
| 2 | × | 100 | MD0 | BLK1 | PA1 | CAxx | ○ | 55 |
| ⋮ | ⋮ | ⋮ | ⋮ | ⋮ | ⋮ | ⋮ | ⋮ | ⋮ |
| 55 | × | 100 | MD1 | BLK2 | PA4 | CAyy | - | - |
| ⋮ | ⋮ | ⋮ | ⋮ | ⋮ | ⋮ | ⋮ | ⋮ | ⋮ |
| 70 | ○ | 100 | MD0 | BLK4 | PA5 | CAzz | - | - |
| ⋮ | ⋮ | ⋮ | ⋮ | ⋮ | ⋮ | ⋮ | ⋮ | ⋮ |

F I G. 15

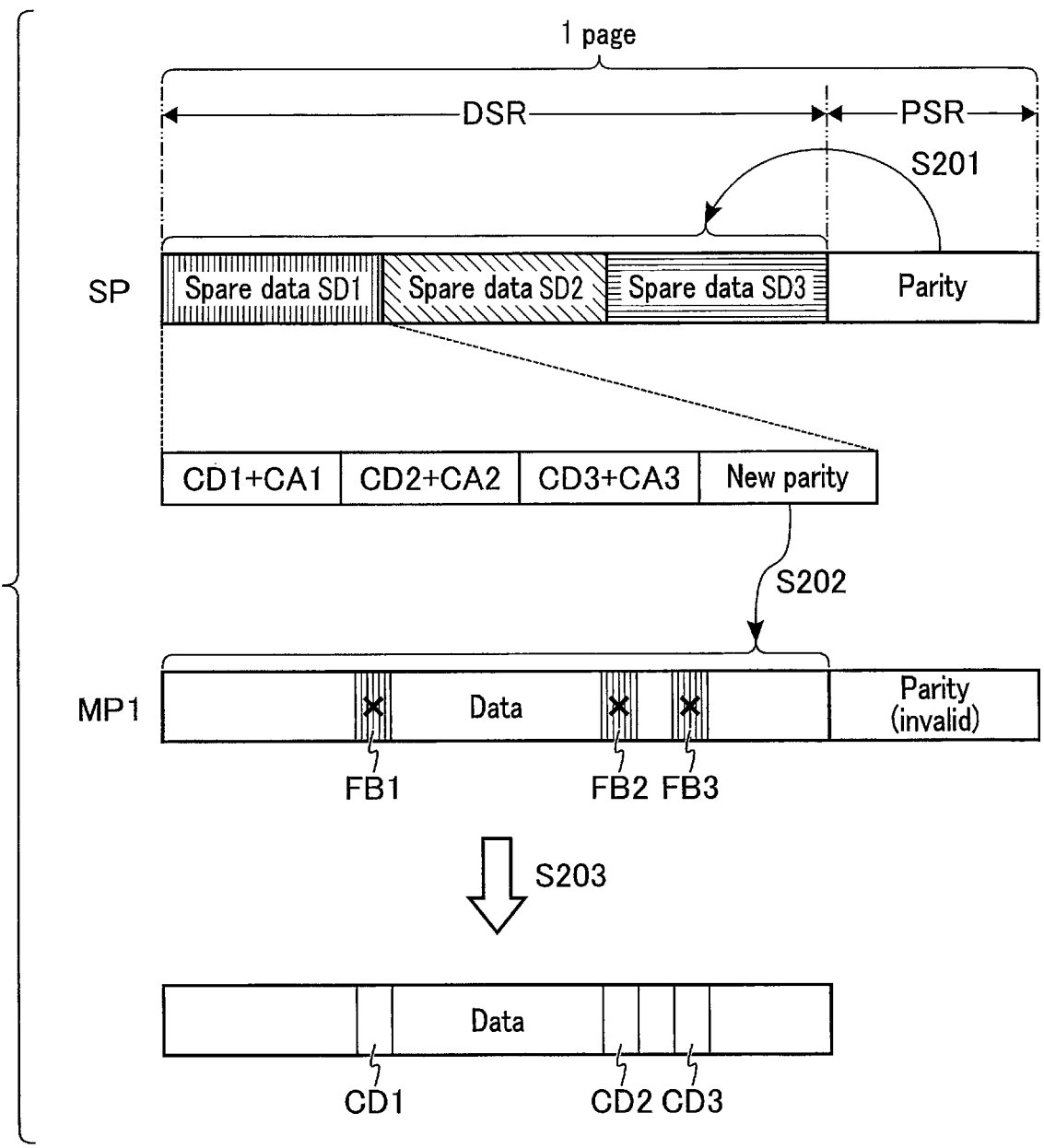
F I G. 18

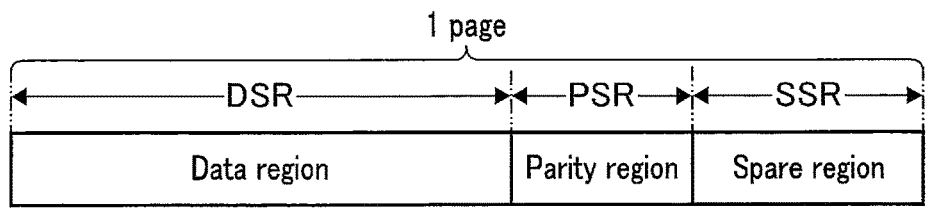
FIG. 19
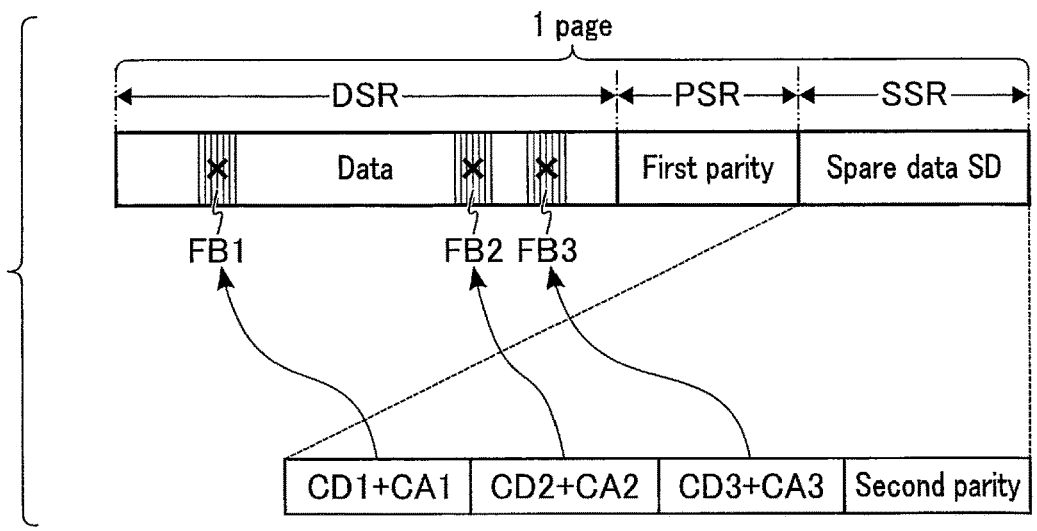
FIG. 20
| ID | Valid | LBA | Chip address | Block address | Page address | Column address | Use spare | Spare address |
|---|---|---|---|---|---|---|---|---|
| 0 | × | zz | zz | zz | zz | zz | — | — |
| 1 | ○ | zz | zz | zz | zz | zz | — | — |
| 2 | ○ | zz | zz | zz | zz | CAxx | ○ | CAxy |
| 3 | ○ | zz | zz | zz | zz | zz | — | — |
| ⋮ | ⋮ | ⋮ | ⋮ | ⋮ | ⋮ | ⋮ | ⋮ | ⋮ |
(PBA spans Chip address through Column address)
FIG. 21

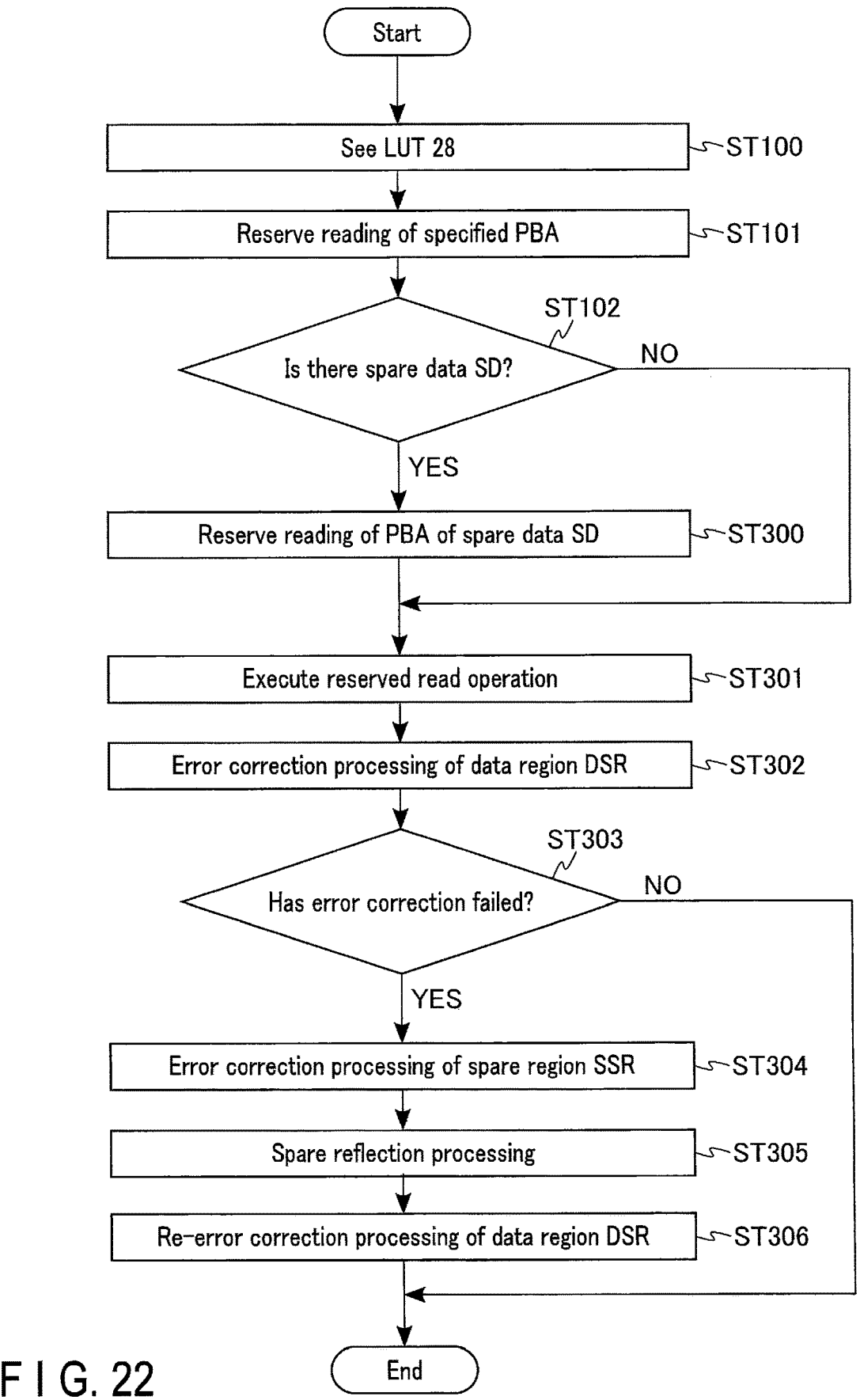
F I G. 22

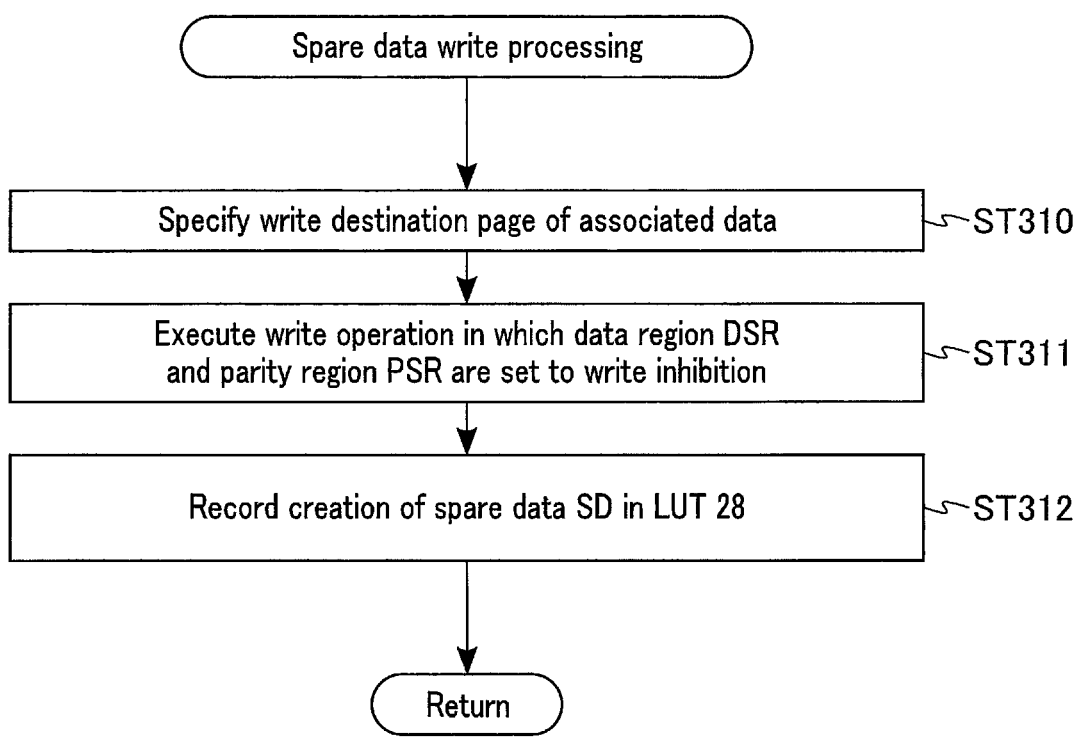
F I G. 23

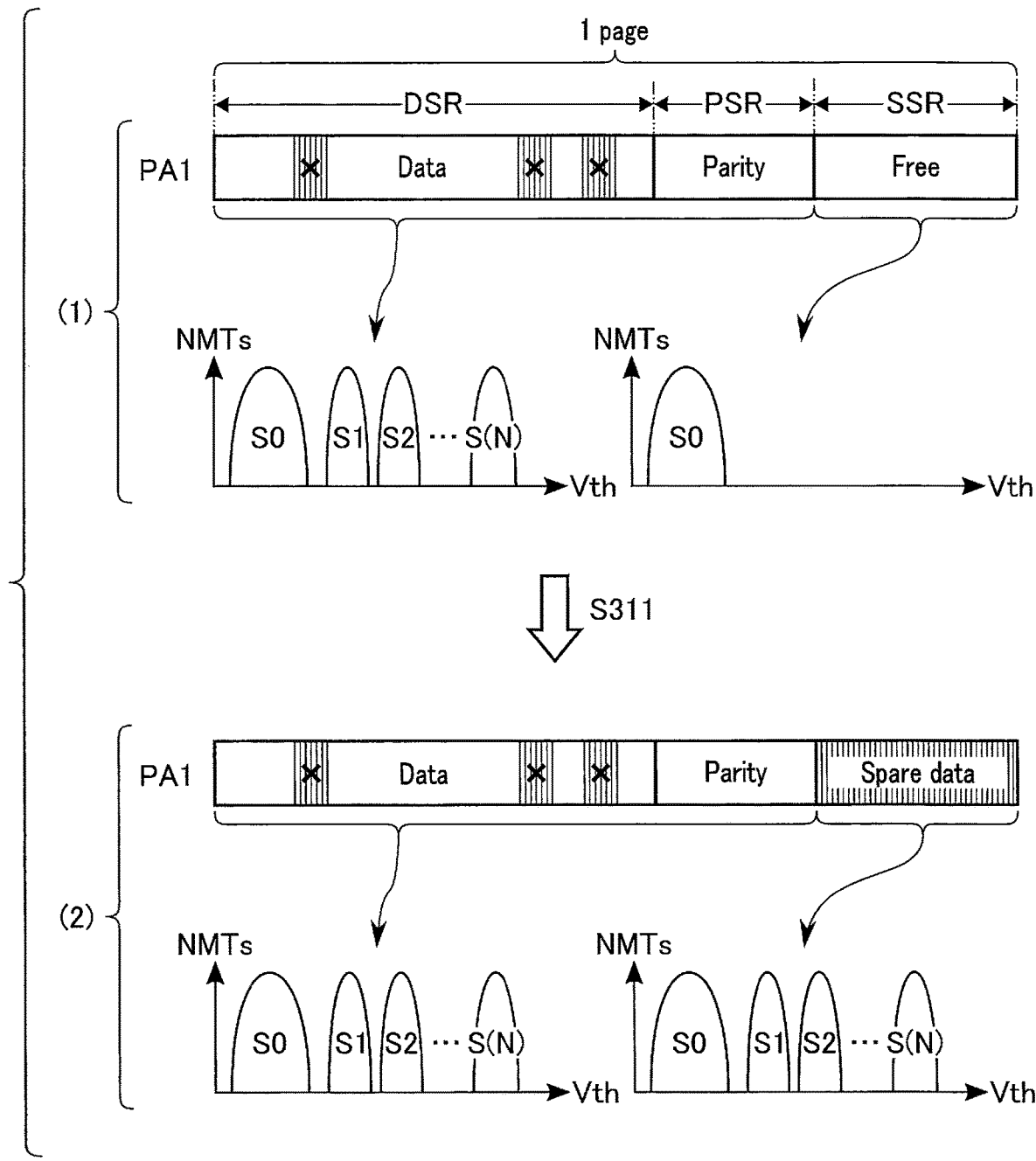
F I G. 24

(1) Before generation of spare data SD

| ID | Valid | LBA | Chip address | Block address | Page address | Column address | Use spare | Spare address |
|----|-------|-----|--------------|---------------|--------------|----------------|-----------|---------------|
| ⋮ | ⋮ | ⋮ | ⋮ | ⋮ | ⋮ | | ⋮ | ⋮ |
| 2 | ○ | 100 | MD0 | BLK1 | PA1 | CAxx | – | – |
| ⋮ | ⋮ | ⋮ | ⋮ | ⋮ | ⋮ | ⋮ | ⋮ | ⋮ |

⇩ S312

(2) After generation of spare data SD

| ID | Valid | LBA | Chip address | Block address | Page address | Column address | Use spare | Spare address |
|----|-------|-----|--------------|---------------|--------------|----------------|-----------|---------------|
| ⋮ | ⋮ | ⋮ | ⋮ | ⋮ | ⋮ | ⋮ | ⋮ | ⋮ |
| 2 | ○ | 100 | MD0 | BLK1 | PA1 | CAxx | ○ | CAxy |
| | ⋮ | ⋮ | ⋮ | ⋮ | ⋮ | ⋮ | ⋮ | ⋮ |

F I G. 25

(1) Before refresh operation
| ID | Valid | LBA | Chip address | Block address | Page address | Column address | Use spare | Spare address |
|---|---|---|---|---|---|---|---|---|
| | ⋮ | ⋮ | ⋮ | · | ⋮ | ⋮ | ⋮ | · |
| 2 | ○ | 100 | MD0 | BLK1 | PA1 | CAxx | ○ | CAxy |
| ⋮ | ⋮ | ⋮ | ⋮ | · | ⋮ | ⋮ | ⋮ | |
| 70 | – | – | – | – | – | – | – | – |
| ⋮ | ⋮ | ⋮ | ⋮ | | ⋮ | ⋮ | ⋮ | · |
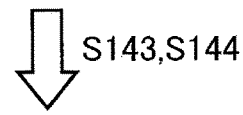
S143, S144
(2) After refresh operation
| ID | Valid | LBA | Chip address | Block address | Page address | Column address | Use spare | Spare address |
|---|---|---|---|---|---|---|---|---|
| ⋮ | | ⋮ | ⋮ | ⋮ | ⋮ | ⋮ | ⋮ | ⋮ |
| 2 | × | 100 | MD0 | BLK1 | PA1 | CAxx | × | CAxy |
| ⋮ | ⋮ | ⋮ | ⋮ | ⋮ | ⋮ | ⋮ | ⋮ | ⋮ |
| 70 | ○ | 100 | MD0 | BLK4 | PA5 | CAzz | – | – |
| ⋮ | ⋮ | ⋮ | | | ⋮ | ⋮ | | |
F I G. 26

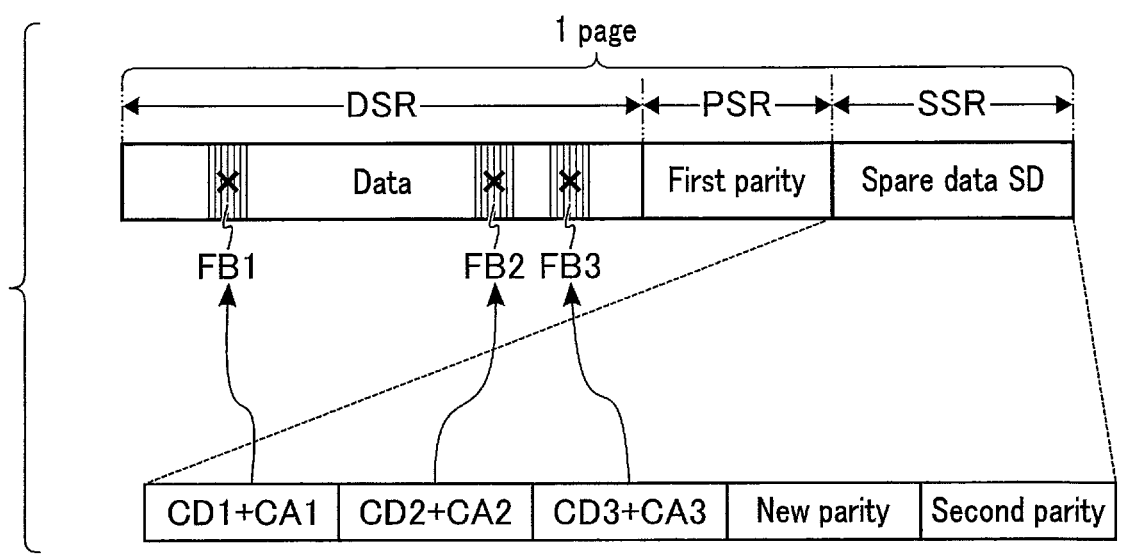
F I G. 27

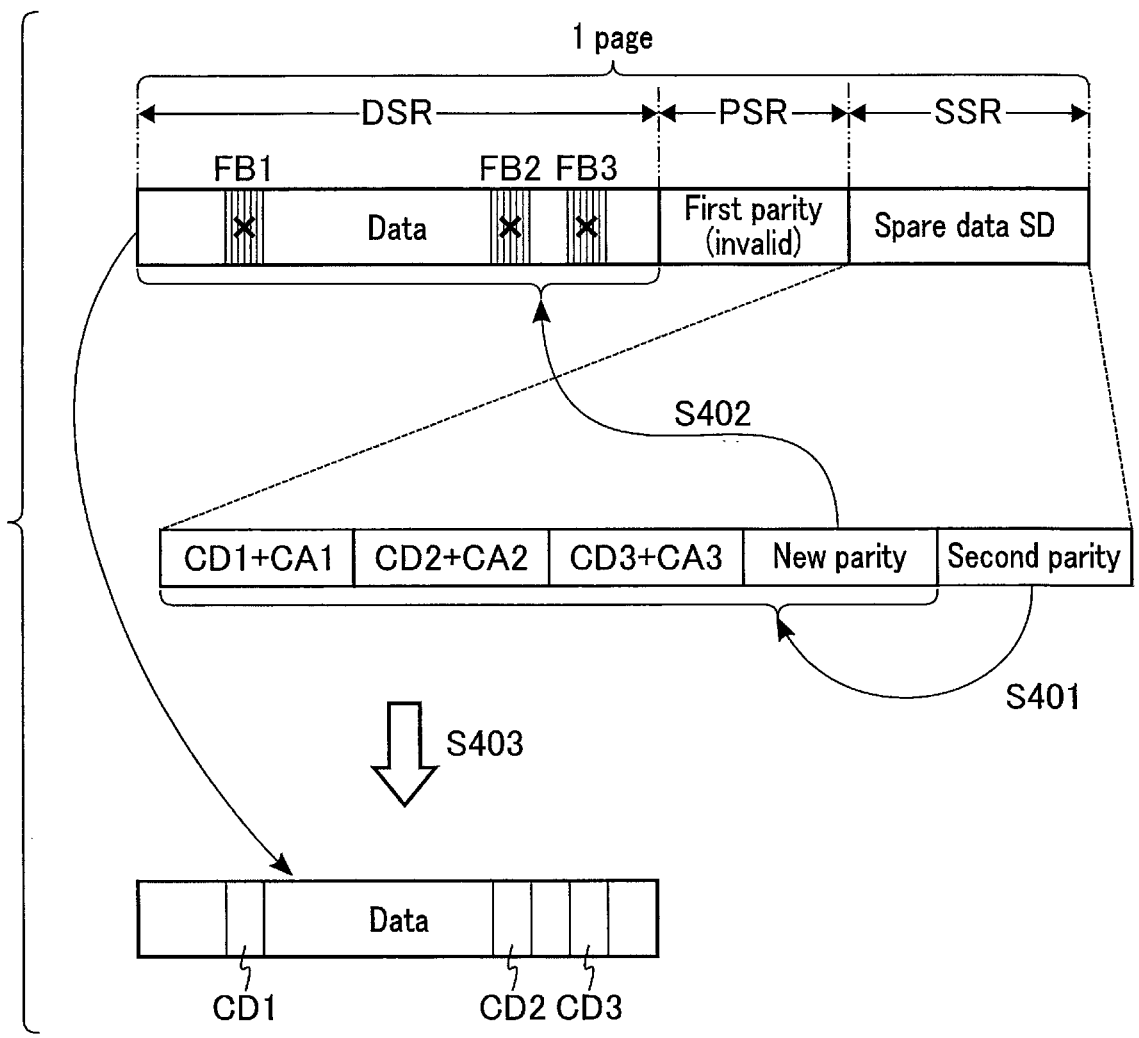
F I G. 29

MEMORY SYSTEM

CROSS-REFERENCE TO RELATED APPLICATIONS

This application is based upon and claims the benefit of priority from Japanese Patent Application No. 2022-143180, filed Sep. 8, 2022, the entire contents of which are incorporated herein by reference.

FIELD

Embodiments described herein relate generally to a memory system.

BACKGROUND

A NAND-type flash memory which can nonvolatilely store data has been known.

BRIEF DESCRIPTION OF THE DRAWINGS

FIG. 1 is a block diagram showing an example of an overall configuration of a memory system according to a first embodiment.

FIG. 5 is a schematic diagram showing an example of a configuration of one page in the memory system according to the first embodiment.

FIG. 6 is a schematic diagram showing an example of a configuration of a spare page in the memory system according to the first embodiment.

FIG. 7 is a table showing an example of a configuration of an LUT in the memory system according to the first embodiment.

FIG. 15 is a schematic diagram showing an example of a change of the LUT due to the refresh operation of the memory system according to the first embodiment.

FIG. 18 is a schematic diagram showing a specific example of the read operation of the memory system according to the second embodiment.

FIG. 19 is a schematic diagram showing an example of a configuration of one page in a memory system according to a third embodiment.

FIG. 20 is a schematic diagram showing an example of a configuration of information stored in one page in the memory system according to the third embodiment.

FIG. 21 is a table showing an example of a configuration of an LUT in the memory system according to the third embodiment.

FIG. 22 is a flowchart showing an example of a read operation of the memory system according to the third embodiment.

FIG. 23 is a flowchart showing an example of spare data write processing in the memory system according to the third embodiment.

FIG. 24 is a schematic diagram showing a specific example of spare data write processing in the memory system according to the third embodiment.

FIG. 25 is a schematic diagram showing an example of a change of the LUT due to the spare data write processing in the memory system according to the third embodiment.

FIG. 26 is a schematic diagram showing an example of a change of the LUT due to the refresh operation of the memory system according to the third embodiment.

FIG. 27 is a schematic diagram showing an example of a configuration of information stored in one page in a memory system according to a fourth embodiment.

FIG. 29 is a schematic diagram showing a specific example of the read operation of the memory system according to the fourth embodiment.

DETAILED DESCRIPTION

Figure 2:
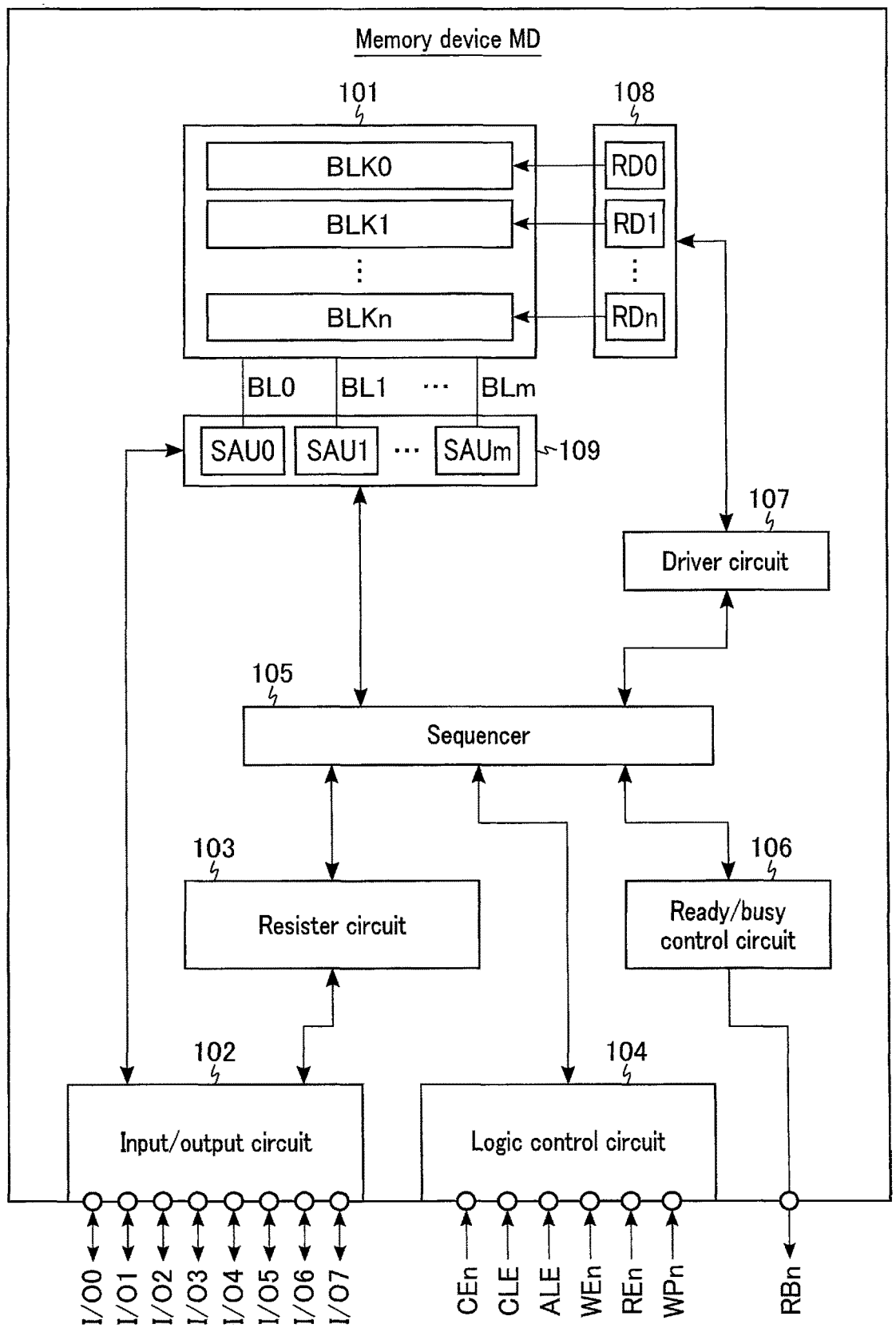
FIG. 2 is a block diagram showing an example of a configuration of a memory device according to the first embodiment.

In general, according to one embodiment, a memory system includes a nonvolatile semiconductor storage device and a memory controller. The nonvolatile semiconductor storage device includes at least one memory device including a plurality of memory cells corresponding to a plurality of pages. The memory controller is configured to control the nonvolatile semiconductor storage device. The pages include a first page. The memory controller is configured to: read first data stored in the first page from the nonvolatile semiconductor storage device; correct a fail bit included in the read first data; generate first spare data including information on the fail bit corrected in the read first data; and store the first spare data in the nonvolatile semiconductor storage device.

Hereinafter, each embodiment will be described with reference to the drawings. The embodiments to be described below exemplify devices and methods for embodying the technical concepts of the invention. The drawings are schematic or conceptual. The illustration of the configuration is omitted as appropriate. In the present specification, the same reference numerals denote constituent elements having almost the same functions and arrangements. Numbers,

<1> First Embodiment

A memory system 1 according to a first embodiment has a function of collectively storing information for correcting fail bits detected in each of a plurality of pages in another page. Hereinafter, details of the memory system 1 according to the first embodiment will be described.

<1-1> Configuration

<1-1-1> Overall Configuration of Memory System 1

FIG. 1 is a block diagram showing an example of an overall configuration of the memory system 1 according to the first embodiment. As shown in FIG. 1, the memory system 1 is connected to an external host device 30 and is configured to be capable of executing an operation according to an instruction from the host device 30. The memory system 1 includes, for example, a memory set 10 and a memory controller 20.

The memory set 10 includes a plurality of memory devices MD0 to MD15 provided on different semiconductor chips. The number of the memory devices MD included in the memory set 10 can be designed to be any number. Each of the memory devices MD is, for example, a NAND-type flash memory which nonvolatilely stores data. Each of the memory devices MD can store data in units of pages. A detailed configuration of the memory device MD will be described later.

The memory controller 20 is configured to be capable of independently controlling each of the memory devices MD. The memory controller 20 can instruct each of the memory devices MD to perform a read operation, a write operation, an erase operation, and other operations in response to the instruction from the host device 30. The memory controller 20 is, for example, SoC (System on Chip).

The memory controller 20 includes, for example, a central processing unit (CPU) 21, a read only memory (ROM) 22, a buffer memory 23, a random access memory (RAM) 24, an error correction code (ECC) circuit 25, a host interface circuit 26, and a NAND interface circuit 27.

The CPU 21 is a circuit that controls the overall operation of the memory controller 20. The CPU 21 issues a command according to the instruction received from the host device 30, for example, and transmits the issued command to the memory device MD. Furthermore, the CPU 21 executes various processes for managing a memory space of the memory device MD. Examples of such processes include patrol operation, garbage collection, and wear leveling. The patrol operation includes a process of collectively storing the information for correcting the fail bits detected in each of the plurality of pages in another page. Details of the patrol operation will be described later.

The ROM 22 is a read-only storage device that retains data nonvolatilely. The ROM 22 stores, for example, the control program, control data, and the like of the memory controller 20.

The buffer memory 23 is a storage device that is also used as a temporary storage region. The buffer memory 23 temporarily stores, for example, data (hereinafter referred to as "write data") instructed to be written by the host device 30, data (hereinafter referred to as "read data") read from the memory device MD, and the like. The buffer memory 23 may be externally connected to the memory controller 20. As the buffer memory 23, for example, a dynamic random access memory (DRAM) is used.

The RAM 24 is a storage device used as a work area of the CPU 21. The RAM 24 stores, for example, a look-up table (LUT) 28 for managing the storage region of the memory device MD. The LUT 28 is read from the memory set 10 when the memory system 1 is powered on. The LUT 28 is stored in the memory set 10 when the memory system 1 is powered off. The LUT 28 is appropriately rewritten according to the operation of the memory system 1. The CPU 21 may generate a difference of the LUT 28 and make a backup in the memory set 10 as appropriate. As the RAM 24, for example, a DRAM, a static random access memory (SRAM), or the like is used.

The ECC circuit 25 is a circuit that executes processing related to data error correction. In the write operation, the ECC circuit 25 generates a parity for each page of write data received from the host device 30. The generated parity is added to the write data and written in the memory device MD. In the read operation, the ECC circuit 25 generates a syndrome based on read data (set of data and parity) received from the memory device MD. Then, the ECC circuit 25 detects an error in the read data based on the generated syndrome and corrects the detected error. Hereinafter, the detected error is referred to as "Fail Bit FB". The processing related to data error correction may be referred to as "error correction processing" or "ECC (Error Checking and Correcting) processing".

The host interface circuit 26 is a hardware interface connected to the host device 30. The host interface circuit 26 manages communication between the memory controller 20 and the host device 30. For example, the host interface circuit 26 supports communication interface standards such as Serial Advanced Technology Attachment (SATA), Serial Attached SCSI (SAS), and PCI Express (PCIe) (trademark).

The NAND interface circuit 27 is a hardware interface connected to each of the memory devices MD. The NAND interface circuit 27 manages communication between the memory controller 20 and the memory set 10. The connection between the NAND interface circuit 27 and the memory device MD supports a NAND interface standard.

For example, channels CH0 to CH3 that can be controlled in parallel are connected to the NAND interface circuit 27. The channel CH0 is connected to the memory devices MD0, MD4, MD8, and MD12. The channel CH1 is connected to the memory devices MD1, MD5, MD9, and MD13. The channel CH2 is connected to the memory devices MD2, MD6, MD10, and MD14. The channel CH3 is connected to the memory devices MD3, MD7, MD11, and MD15. A set of the plurality of memory devices MD that can be controlled in parallel is referred to as, for example, a "bank". In this example, the memory set 10 includes four banks B0 to B3. The bank B0 includes the memory devices MD0 to MD3. The bank B1 includes the memory devices MD4 to MD7. The bank B2 includes the memory devices MD8 to MD11. The bank B3 includes the memory devices MD12 to MD15. The plurality of memory devices MD connected to the same channel CH can operate in parallel except for operations involving communication between the memory device MD and the NAND interface circuit 27. The number of the memory devices MD included in the memory set 10 and configurations of the bank and the channel can be freely designed.

<1-1-2> Configuration of Memory Device MD

FIG. 2 is a block diagram showing an example of a configuration of the memory device MD according to the first embodiment. As shown in FIG. 2, the memory device MD includes, for example, a memory cell array 101, an input/output circuit 102, a register circuit 103, a logic control circuit 104, a sequencer 105, a ready/busy control circuit 106, a driver circuit 107, a row decoder module 108, and a sense amplifier module 109.

The memory cell array 101 includes a plurality of blocks BLK0 to BLKn ("n" is an integer of 1 or more). The block BLK is a set of a plurality of memory cells. The block BLK includes a plurality of pages. The page is a unit in which reading and writing of data are executed. Although not illustrated, the memory cell array 101 is provided with a plurality of bit lines BL0 to BLm ("m" is an integer of 1 or more) and a plurality of word lines WL. Each memory cell is associated with, for example, one bit line BL and one word line WL.

The input/output circuit 102 is an interface circuit that manages transmission and reception of an input/output signal I/O to and from the memory controller 20. The input/output circuit 102 can input and output, for example, 8-bit signals (I/O0 to 1/O7) in parallel. The input/output signal I/O may include data, status information, address information, command, and the like. The input/output circuit 102 can input and output data between the sense amplifier module 109 and the memory controller 20. The input/output circuit 102 can output the status information transferred from the register circuit 103 to the memory controller 20. The input/output circuit 102 can output each of the address information and the command transferred from the memory controller 20 to the register circuit 103.

The register circuit 103 is a circuit capable of temporarily storing the status information, the address information, the command, and the like. The status information is transferred to the input/output circuit 102 based on an instruction from the memory controller 20, and is output to the memory controller 20. The address information may include, for example, a block address, a page address, a column address, and the like. The block address is assigned to each of the blocks BLK. Each of the blocks BLK can be specified based on the block address. The page address is assigned to each of the word lines WL, for example. Each page can be specified based on the page address. The column address is assigned to each of the bit lines BL. Each memory cell in the page can be specified based on the column address. The command includes instructions related to various operations of the memory device MD.

The logic control circuit 104 controls each of the input/output circuit 102 and the sequencer 105 based on a control signal received from the memory controller 20. As such control signals, for example, signals CEn, CLE, ALE, WEn, REn, and WPn are used. The signal CEn is a signal that enables the memory device MD. The signal CLE is a signal that notifies the input/output circuit 102 that the received input/output signal I/O is the command CMD. The signal ALE is a signal that notifies the input/output circuit 102 that the received input/output signal I/O is the address information ADD. The signal WEn is a signal that instructs the input/output circuit 102 to input the input/output signal I/O. The signal REn is a signal that instructs the input/output circuit 102 to output the input/output signal I/O. The signal WPn is a signal that sets the memory device MD in a protected state when a power supply is turned on and off.

The sequencer 105 is a circuit that controls the overall operation of the memory device MD. For example, the sequencer 105 executes the read operation, the write operation, the erase operation, and the like based on the command and the address information stored in the register circuit 103.

In addition, the sequencer 105 updates the status information in the register circuit 103 based on the operation and state of the memory device MD.

The ready/busy control circuit 106 generates a signal RBn based on an operation state of the sequencer 105. The signal RBn is a signal that notifies the memory controller 20 whether the memory device MD is in a ready state or a busy state. The "ready state" is a state in which the memory device MD accepts the instruction from the memory controller 20. The "busy state" is a state in which the memory device MD does not accept the instruction from the memory controller 20.

The driver circuit 107 generates a voltage used in the read operation, the write operation, the erase operation, and the like based on the control of the sequencer 105. Then, the driver circuit 107 supplies the generated voltage to the memory cell array 101, the row decoder module 108, and the sense amplifier module 109.

The row decoder module 108 is a circuit connected to a wiring (word line WL or the like) in a row direction provided in the memory cell array 101. The row decoder module 108 includes a plurality of row decoders RD0 to RDn associated with the plurality of blocks BLK0 to BLKn, respectively. Each of the row decoders RD includes a block decoder capable of decoding the block address. The row decoder module 108 selects the block BLK based on a decoding result of the block decoder of each of the row decoders RD. The row decoder module 108 transfers the voltage supplied from the driver circuit 107 to, for example, the word line WL in the selected block BLK via the associated row decoder RD.

The sense amplifier module 109 is a circuit connected to a wiring (bit line BL) in a column direction provided in the memory cell array 101. The sense amplifier module 109 includes a plurality of sense amplifier units SAU0 to SAUm associated with the plurality of bit lines BL0 to BLm, respectively. Each of the sense amplifier units SAU has a function of applying a voltage to the associated bit line BL, a function of determining data based on the voltage of the bit line BL, and a function of temporarily storing data. In the read operation, the sense amplifier module 109 reads the data from the memory cell array 101 and transfers the read data to the input/output circuit 102. In the write operation, the sense amplifier module 109 applies a desired voltage to the bit line BL based on the data received from the input/output circuit 102.

In the memory device MD, a set of the memory cell array 101, the row decoder module 108, and the sense amplifier module 109 is also referred to as, for example, "plane". Each of the memory devices MD may include a plurality of planes. The memory device MD can execute the read operation, the write operation, and the erase operation in parallel for the plurality of planes. The plane may include circuits other than the memory cell array 101, the row decoder module 108, and the sense amplifier module 109.

<1-1-3> Circuit Configuration of Memory Cell Array 101

Figure 3:
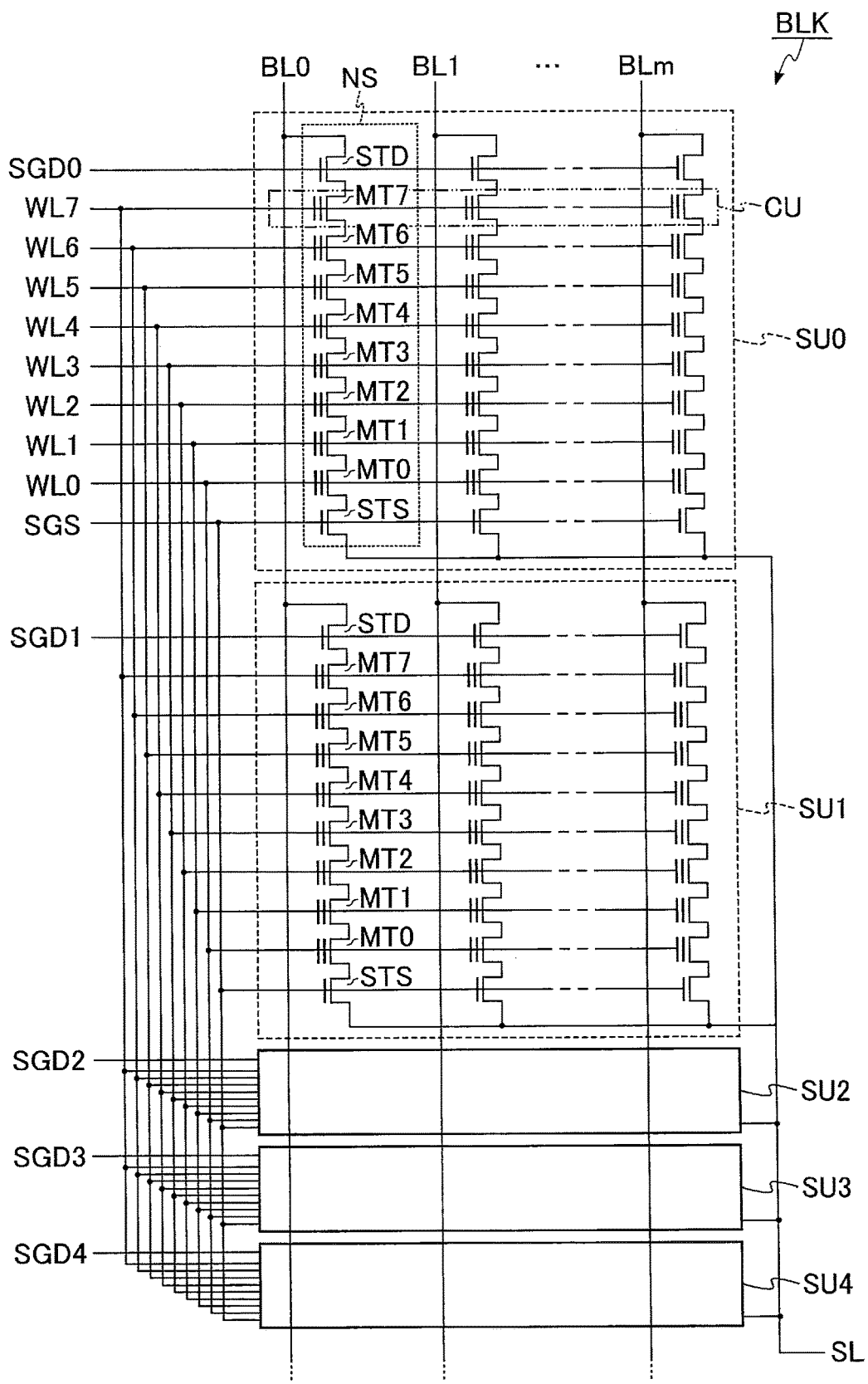
FIG. 3 is a circuit diagram showing an example of a circuit configuration of a memory cell array included in the memory device according to the first embodiment.

FIG. 3 is a circuit diagram showing an example of a circuit configuration of the memory cell array 101 included in the memory device MD according to the first embodiment. FIG. 3 shows one of the plurality of blocks BLK included in the memory cell array 101. As shown in FIG. 3, in the block BLK, the plurality of bit lines BL0 to BLm, a plurality of word lines WL0 to WL7, select gate lines SGD0 to SGD4, a select gate line SGS, and a source line SL are provided. The select gate lines SGD0 to SGD4 and the word lines WL0 to WL7 are provided for each of the blocks BLK. The bit lines BL0 to BLm are shared by the plurality of blocks BLK. The source line SL may be shared by the plurality of blocks BLK or may be divided.

The block BLK includes, for example, five string units SU0 to SU4. Each of the string units SU includes a plurality of NAND strings NS. The plurality of NAND strings NS are each associated with the bit lines BL0 to BLm. That is, each of the bit lines BL is shared by the NAND string NS to which the same column address is assigned among the plurality of blocks BLK. Each of the NAND strings NS is connected between the associated bit line BL and source line SL.

Each of the NAND strings NS includes, for example, memory cell transistors MT0 to MT7 and select transistors STD and STS. Each of the memory cell transistors MT is a memory cell including a control gate and a charge accumulation layer and nonvolatilely retains (stores) data. A threshold voltage of the memory cell transistor MT can be changed based on a charge amount injected into the charge accumulation layer. The memory cell transistor MT stores data corresponding to the threshold voltage. Each of the select transistors STD and STS is used for selecting the string unit SU.

In each of the NAND string NS, the select transistor STD, the memory cell transistors MT7 to MT0, and the select transistor STS are connected in series in this order. Specifically, the drain and source of the select transistor STD are connected to the associated bit line BL and the drain of the memory cell transistor MT7, respectively. The drain and source of the select transistor STS are connected to the source of the memory cell transistor MT0 and the source line SL, respectively. The memory cell transistors MT0 to MT7 are connected in series between the select transistors STD and STS.

The select gate lines SGD0 to SGD4 are associated with the string units SU0 to SU4, respectively. Each of the select gate lines SGD is connected to the gate of each of the plurality of select transistors STD included in the associated string unit SU. The select gate line SGS is connected to the gate of each of the plurality of select transistors STS included in the associated block BLK. The word lines WL0 to WL7 are respectively connected to the control gates of the plurality of memory cell transistors MT0 to MT7 included in the associated block BLK.

In this specification, a group of the plurality of memory cell transistors MT connected to the common word line WL in the same string unit SU is referred to as a "cell unit CU". In the present specification, a set of 1-bit data of each of the plurality of memory cell transistors MT included in the cell unit CU is defined as "1 page" or "1-page data". The cell unit CU may have a storage capacity of two or more page data according to the number of bits of data stored in each of the memory cell transistors MT.

The circuit configuration of the memory cell array 101 included in the memory device MD according to the first embodiment may be another configuration. For example, the number of the string units SU included in each of the blocks BLK and the number of the memory cell transistors MT and the select transistors STD and STS included in each of the NAND strings NS may be designed in any number.

<1-1-4> Threshold Voltage Distribution of Memory Cell Transistor MT

Figure 4:
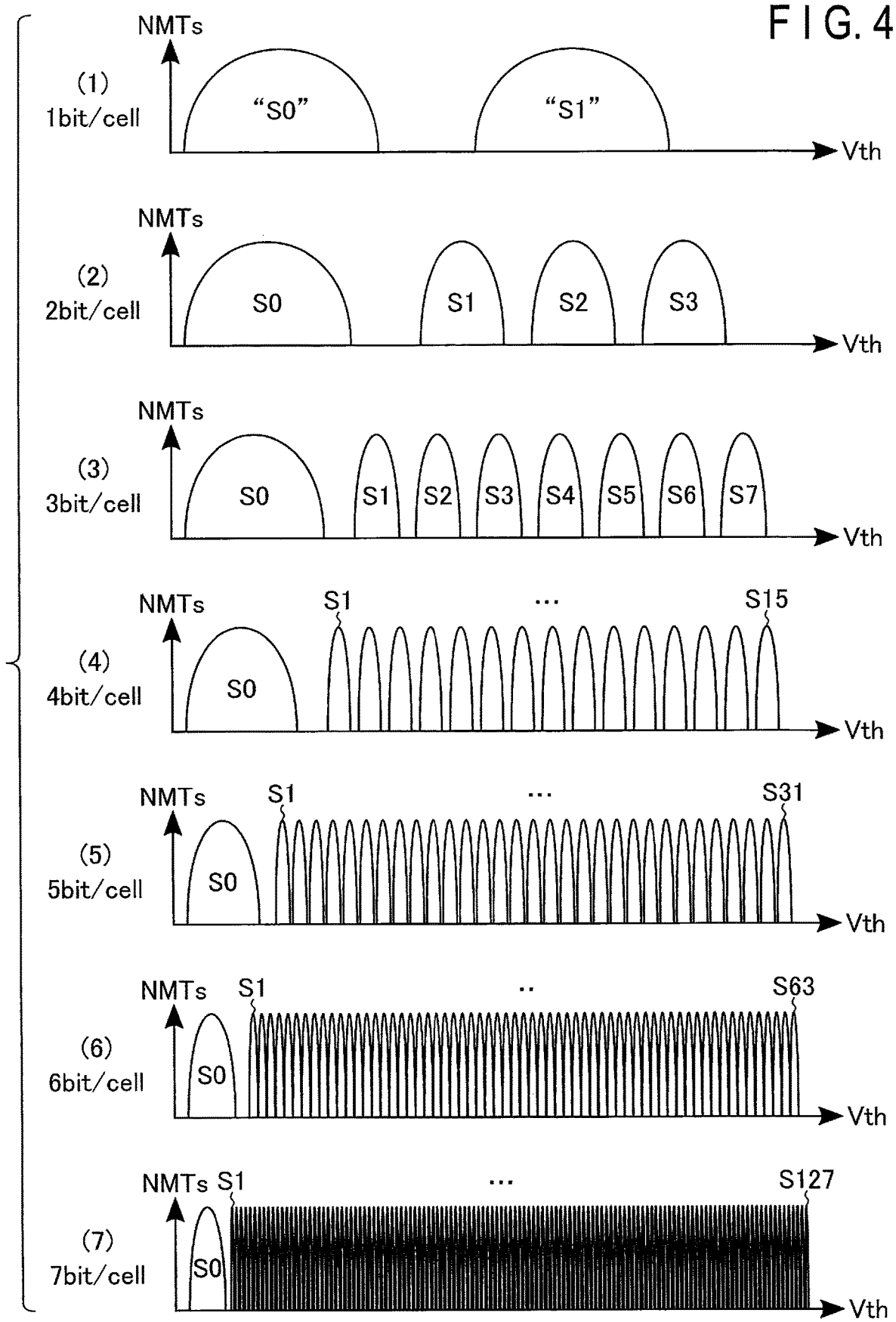
FIG. 4 is a schematic diagram showing an example of a distribution of threshold voltage of a memory cell transistor in the memory device according to the first embodiment.

FIG. 4 is a schematic diagram showing an example of a distribution of threshold voltage of the memory cell transistor MT in the memory device MD according to the first embodiment. (1) to (7) of FIG. 4 show the threshold voltage distribution of the memory cell transistor MT in a case where 1-bit data to 7-bit data are stored in the memory cell transistor MT, respectively. The horizontal axis of each distribution diagram shown in FIG. 4 corresponds to the threshold voltage (Vth) of the memory cell transistor MT. The vertical axis of each distribution diagram shown in FIG. 4 corresponds to the number (NMTs) of the memory cell transistors MT. As shown in FIG. 4, in the threshold voltage distribution of the memory cell transistor MT, a plurality of states according to the number of bits of data stored in one memory cell transistor MT are formed.

In a case where the 1-bit data is stored in one memory cell transistor MT (1 bit/cell), the threshold voltage distribution of the memory cell transistor MT has two states S0 and S1 as shown in (1) of FIG. 4. In the 1 bit/cell, different 1-bit data are assigned to the respective two states S0 and S1.

In a case where 2-bit data is stored in one memory cell transistor MT (2 bit/cell), the threshold voltage distribution of the memory cell transistor MT has four states S0 to S3 as shown in (2) of FIG. 4. In the 2 bit/cell, different 2-bit data are assigned to the respective four states S0 to S3.

In a case where 3-bit data is stored in one memory cell transistor MT (3 bit/cell), the threshold voltage distribution of the memory cell transistor MT has eight states S0 to S7 as shown in (3) of FIG. 4. In the 3 bit/cell, different 3-bit data are assigned to the respective eight states S0 to S7.

In a case where 4-bit data is stored in one memory cell transistor MT (4 bit/cell), the threshold voltage distribution of the memory cell transistor MT has 16 states S0 to S15 as shown in (4) of FIG. 4. In the 4 bit/cell, different 4-bit data are assigned to the respective 16 states S0 to S15.

In a case where 5-bit data is stored in one memory cell transistor MT (5 bit/cell), the threshold voltage distribution of the memory cell transistor MT has 32 states S0 to S31 as shown in (5) of FIG. 4. In the 5 bit/cell, different 5-bit data are assigned to the respective 32 states S0 to S31.

In a case where 6-bit data is stored in one memory cell transistor MT (6 bit/cell), the threshold voltage distribution of the memory cell transistor MT has 64 states S0 to S63 as shown in (6) of FIG. 4. In the 6 bit/cell, different 6-bit data are assigned to the respective 64 states S0 to S63.

In a case where 7-bit data is stored in one memory cell transistor MT (7 bit/cell), the threshold voltage distribution of the memory cell transistor MT has 128 states S0 to S127 as shown in (7) of FIG. 4. In the 7 bit/cell, different 7-bit data are assigned to the respective 128 states S0 to S127.

Data of eight or more bits may be stored in each of the memory cell transistors MT. In a case where the memory cell transistor MT stores k bit data (k is an integer of 1 or more), at least $2^k$ states are provided in the threshold voltage distribution of the memory cell transistor MT. A verify voltage and a read voltage are set between adjacent states.

In the write operation, the memory device MD repeatedly executes a set of a program operation for increasing the threshold voltage of the memory cell transistor MT and the read operation using the verify voltage. As a result, the memory device MD can set the threshold voltage of the memory cell transistor MT to a voltage corresponding to the state of data to be stored, and can store data in the memory cell transistor MT.

In the read operation, the memory device MD executes the read operation using at least one read voltage. Then, the memory device MD specifies a state corresponding to the threshold voltage of the memory cell transistor MT based on whether or not the memory cell transistor MT to which the read voltage is applied is turned on. As a result, the memory device MD can determine data stored in each of the memory cell transistors MT.

<1-1-5> Configuration of Page

FIG. 5 is a schematic diagram showing an example of a configuration of one page in the memory system 1 according to the first embodiment. As shown in FIG. 5, one page includes, for example, a data region DSR and a parity region PSR. The data region DSR is a region where the data is stored. The parity region PSR is a region where the parity is stored. A size of the parity region PSR is designed based on an error correction capability required in ECC processing.

In the memory system 1 according to the first embodiment, a page for storing write data and a page used for data correction can be provided. Hereinafter, the page for storing write data is referred to as a "main page MP". The page used for data correction is referred to as a "spare page SP". The main page MP includes the data requested to be written by the host device 30 and the parity generated based on the data. The spare page SP is provided in association with at least one main page MP. The spare page SP includes information used for correction of the fail bit detected in the associated main page MP. The spare page SP may not be associated with the main page MP, or a plurality of the spare pages SP may be associated with the main page MP.

(Configuration of Spare Page SP)

FIG. 6 is a schematic diagram showing an example of a configuration of the spare page SP in the memory system 1 according to the first embodiment. FIG. 6 illustrates a case where the spare page SP stores information associated with three main pages MP1 to MP3. As shown in FIG. 6, the data region DSR of the spare page SP stores spare data SD1, SD2, and SD3. The parity region PSR of the spare page SP stores the parity generated based on the data stored in the data region DSR of the spare page SP.

The spare data SD1, SD2, and SD3 are associated with the main pages MP1, MP2, and MP3, respectively. That is, the spare data SD1, SD2, and SD3 include the information used for correction of the fail bits detected in the main pages MP1, MP2, and MP3, respectively. Hereinafter, a specific example of the information stored in the spare data SD will be described using a set of the main page MP1 and the spare data SD1 as a representative.

FIG. 6 illustrates a case where the fail bits FB1, FB2, and FB3 are detected by the ECC processing for the main page MP1. In this case, the spare data SD1 includes a set (CD1+CA1) of correction data CD1 and a column address CA1 related to the fail bit FB1, a set (CD2+CA2) of correction data CD2 and a column address CA2 related to the fail bit FB2, and a set (CD3+CA3) of correction data CD3 and a column address CA3 related to the fail bit FB3. The correction data CD1, CD2, and CD3 correspond to the corrected data of the fail bits FB1, FB2, and FB3, respectively.

Similarly to the spare data SD1, the spare data SD2 and SD3 may include information used for correction of the fail bit FB detected in the associated main page MP. Each spare data SD may include information (set of the correction data CD and the column address CA) used for correction of at least one fail bit FB. If the position of the bit to be corrected can be specified, the correction data CD and the address information other than the column address CA may be combined. The number of associated fail bits FB may be different among a plurality of the spare data SD stored in the same page. In the first embodiment, the number of spare data SD included in the spare page SP is preferably plural.

<1-1-6> Configuration of LUT 28

Hereinafter, an example of a specific configuration of the LUT 28 will be described.

The LUT 28 is a table using a logical cluster address (LCA) as an index. The LCA is an address obtained by collecting logical block addresses (LBAs) in cluster units. The cluster is, for example, 4 KiB user data continuous from the start LBA, and is a minimum unit of address management on a media. The "media" is also called a super block and is a collection of the plurality of blocks BLK. The plurality of blocks BLK are associated with a plurality of physical block addresses (PBAs) assigned to the memory device MD. The memory system 1 can manage writing/ erasing to and from the memory device MD in units of superblocks. Each entry of the LUT 28 stores a media cluster address (MCA). The MCA is a physical address indicating a storage destination of data (cluster) written to the media.

In a case where reading data from the memory device MD, the memory controller 20 accesses the LUT 28 using the LCA of the command issued by the host device 30 as an index to acquire the MCA. Then, the memory controller 20 performs reading for the acquired MCA. In addition, in a case where data is written to the memory device MD, the memory controller 20 specifies the MCA of a medium to which data managed in the memory controller 20 can be written. Then, the memory controller 20 writes the data to the specified MCA. Subsequently, the memory controller 20 updates the entry of the LUT 28 to the MCA in which the data is written using the LCA of the written data as an index. That is, the LUT 28 is updated every time the data (cluster) is written in the storage region of user data in the memory device MD.

Hereinafter, information regarding a logical address designated by the host device 30 is simply referred to as "LBA". Information regarding the physical address assigned to the memory device MD is simply referred to as "PBA".

FIG. 7 is a table showing an example of the configuration of the LUT 28 in the memory system 1 according to the first embodiment. As shown in FIG. 7, the LUT 28 includes, for example, "ID (identifier)", "LBA", "Valid", "PBA", "Use spare", and "Spare ID" as items (columns). "zz" described in the tables of the drawings referred to below indicates that some numerical value is recorded. "-" described in the tables of the drawings referred to below indicates that the field is blank (empty).

"ID" is an identifier of the entry of the LUT 28. The "Valid" is information indicating whether or not information included in the entry is valid. In this example, in a case where "o" is stored in "Valid", it is indicated that the information included in the entry is valid. In a case where "x" is stored in "Valid", it indicates that information included in the record is invalid. "LBA" corresponds to the logical address associated with the entry. "PBA" corresponds to the physical address associated with the entry. The "PBA" includes, for example, a chip address, a block address, a page address, and a column address. The chip address is assigned to each of the plurality of memory devices MD. Each of the memory devices MD can be specified based on the chip address. The configuration of the "PBA" may be any configuration as long as a write destination of data can be specified. As the "PBA", parameters other than the configuration described above may be used.

The "Use spare" is information indicating whether or not the spare data SD associated with the LBA of the entry is generated. In this example, in a case where "o" is stored in "Use spare", it is indicated that the spare data SD associated with the LBA of the entry is generated. The "Spare ID" is information indicating the position of the entry of the LUT 28 in which the spare data SD is stored. In this example, in a case where "o" is stored in "Use spare", the information is recorded in "Spare ID". In a case where "o" is not stored in "Use spare" of the entry corresponding to the main page MP, the LBA of the entry does not include the spare data SD. In a case where "o" is stored in "Use spare" of the entry corresponding to the main page MP, at least one spare page SP is associated with the LBA of the entry.

In this example, "Spare ID=55" is recorded in the entry of "ID=2". In this case, the entry of "ID=2" corresponds to the main page MP associated with a certain LBA. The entry of "ID=55" referred to based on "Spare ID=55" corresponds to information indicating the write destination of the spare data SD of the main page MP. In a case where the plurality of spare data SD are associated with the main page MP, "o" is stored in "Use spare" of the entry of "ID=55", and the PBA of the spare data SD subsequent to the entry indicated by "Spare ID" of the entry of "ID=55" is stored.

In the LUT 28, a format in which the main page MP and the spare data SD (spare page SP) are associated with each other is not limited thereto. The format of the LUT 28 may be able to manage at least information of the main page MP and information of the spare data SD in association with each other. Information on whether the plurality of spare data SD (spare pages SP) are used and information on the PBA of the plurality of spare data SD may be stored in the entry of the main page MP. The memory controller 20 may individually include the LUT 28 associated with the main page MP and the LUT 28 associated with the spare page SP.

<1-2> Operation

Figure 8:
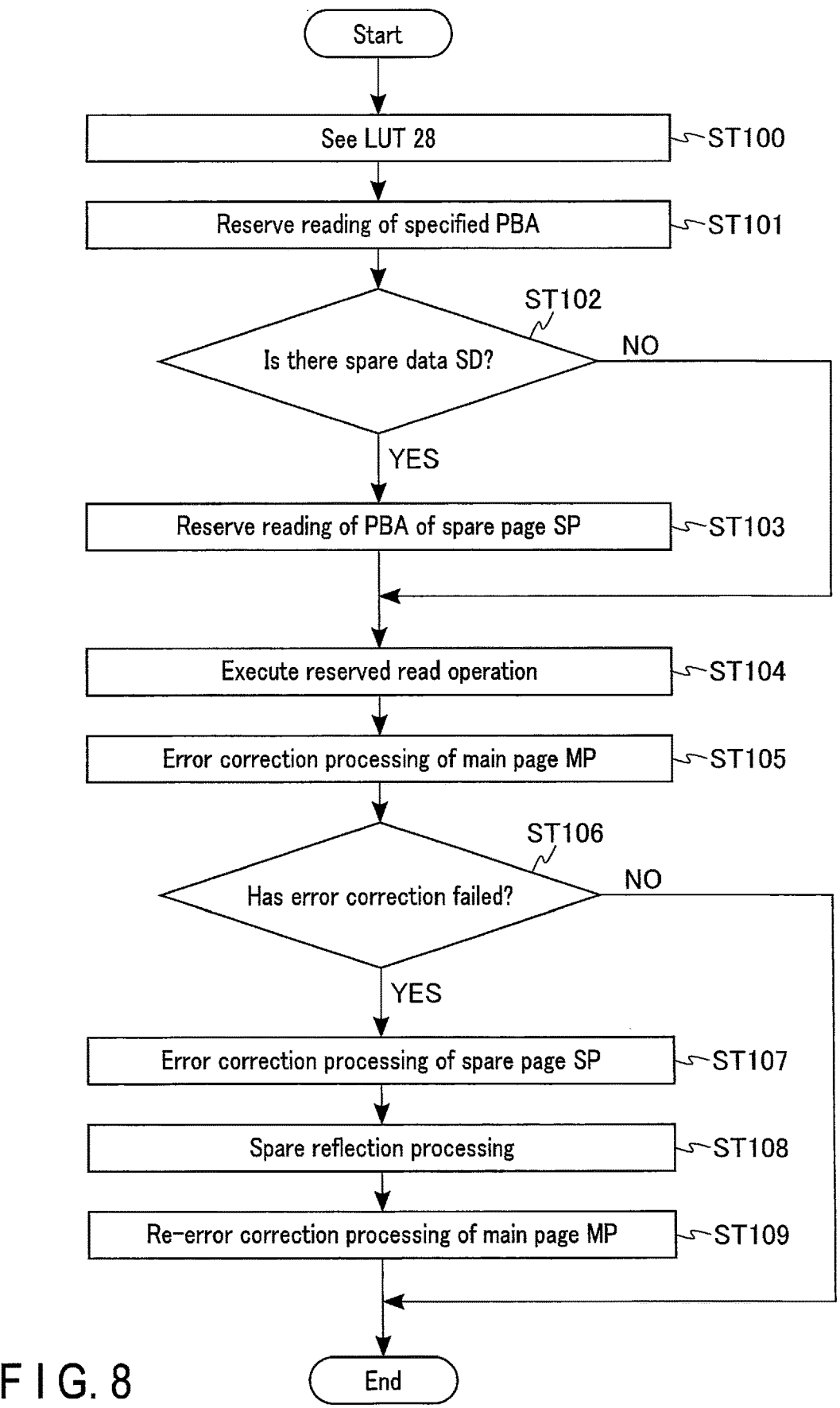
FIG. 8 is a flowchart showing an example of a read operation of the memory system according to the first embodiment.

Hereinafter, an operation of the memory system 1 according to the first embodiment will be described.
<1-2-1> Read Operation In the memory system 1, the processing of the read operation changes according to the presence or absence of the spare data SD. FIG. 8 is a flowchart showing an example of the read operation of the memory system 1 according to the first embodiment. Hereinafter, a flow of the read operation of the memory system 1 according to the first embodiment will be described with reference to FIG. 8.

For example, when receiving a read request from the host device 30, the memory controller 20 starts a series of processing of the read operation (Start). The read request received by the memory controller 20 from the host device 30 includes the logical address to be read.

The memory controller 20 that has received the read request refers to the LUT 28 and searches for an entry corresponding to the logical address to be read (ST100). Then, the memory controller 20 specifies the PBA to be read from the entry specified by the search.

Next, the memory controller 20 reserves the read operation of the specified PBA (ST101). The read operation reserved in ST101 corresponds to the read operation of the main page MP.

Next, the memory controller 20 confirms whether or not there is spare data SD from the specified entry (ST102). The memory controller 20 confirms whether or not there is the spare data SD, for example, by referring to the column of "Use spare" of the entry specified in the processing of ST100.

In the processing of ST102, in a case where it is not confirmed that there is the spare data SD (ST102: NO), the memory controller 20 proceeds to the processing of ST104.

In the processing of ST102, in a case where it is confirmed that there is the spare data SD (ST102: YES), the memory controller 20 reserves the read operation of the PBA of the spare page SP (ST103). The memory controller 20 specifies the PBA of the spare page SP from, for example, the entry specified based on information stored in the column of "Spare ID" of the entry specified in the processing of ST101. If the processing of ST103 is completed, the memory controller 20 proceeds to the processing of ST104.

In the processing of ST104, the memory controller 20 executes the reserved read operation. Specifically, the memory controller 20 transmits the command and the address information based on the reserved read operation to the memory device MD including the page to be read. Then, the memory device MD reads the data from the page designated by the address information based on the received command and address information. Then, the memory device MD transmits the read data to the memory controller 20. The memory controller 20 stores the data received from at least one memory device MD (that is, the memory set 10) in the buffer memory 23. The processing of ST104 includes the read operation for at least the main page MP. In the processing of ST104, in a case where the main page MP and the spare page SP are assigned to the different memory devices MD or the different planes in the same memory device MD, the memory system 1 may execute the read operation for the main page MP and the read operation for the spare page SP in parallel.

Next, the memory controller 20 executes the error correction (ECC) processing of the main page MP (ST105).

Next, the memory controller 20 confirms whether or not error correction has failed in the processing of ST105 (ST106).

In a case where the error correction has not failed, that is, in a case where the error correction has succeeded (ST106: NO), the memory controller 20 transmits, for example, the read data of the corrected main page MP to the host device 30, and ends the series of processing of the read operation (End).

In a case where the error correction has failed (ST106: YES), the memory controller 20 executes the error correction processing for the spare page SP read by the processing of ST106 (ST107). In this example, it is assumed that the error correction processing of ST107 succeeds.

If the processing of ST107 is completed, the memory controller 20 executes spare reflection processing (ST108). The spare reflection processing extracts the spare data SD associated with the main page MP from the read data of the spare page SP. Then, the memory controller 20 reflects the correction data CD included in the extracted spare data SD in the read data of the main page MP based on the associated column address CA.

If the processing of ST108 is completed, the memory controller 20 executes re-error correction processing of the main page MP (ST109). Specifically, in the re-error correction processing, the memory controller 20 executes the error correction processing using the parity of the main page MP on the read data of the main page MP on which the correction data CD is reflected. In a case where the error correction processing has succeeded, the memory controller 20 transmits, for example, the read data of the corrected main page MP to the host device 30, and ends the series of processing of FIG. 8 (End).

In the above description, the case where the read operation is executed based on the request of the host device 30 has been exemplified; however, the present invention is not limited to this case. The read operation described above can also be applied to the read operation spontaneously executed by the memory controller 20. In this case, signal exchange between the memory controller 20 and the host device 30 is omitted.

In the first embodiment, the memory controller 20 may omit the processing of steps ST105 and ST106 in a case where the read operation of the spare page SP is executed. In this case, the memory controller 20 executes the processing of ST107 after the processing of ST104. As a result, the memory system 1 can omit the time required for the processing of ST105 and ST106, and can speed up the read operation as compared with the case of executing the processing of ST107 via the processing of ST105 and ST106.

<1-2-2> Patrol Operation

The memory system 1 according to the first embodiment spontaneously executes the patrol operation during a period in which operation based on an instruction from the host device 30 is not being executed. In other words, the memory system 1 according to the first embodiment executes the patrol operation independently of the instruction from the host device 30 during background operation.

The patrol operation is an operation of detecting a page in which the fail bit increases. In the patrol operation, the memory system 1 generates the spare data SD of the page in which the fail bit increases before the error correction cannot be performed. In the patrol operation, the memory system 1 executes the refresh operation according to the state of the page (for example, the number of fail bits FB). The memory system 1 may correct the read voltage for each page in the patrol operation.

Figure 9:
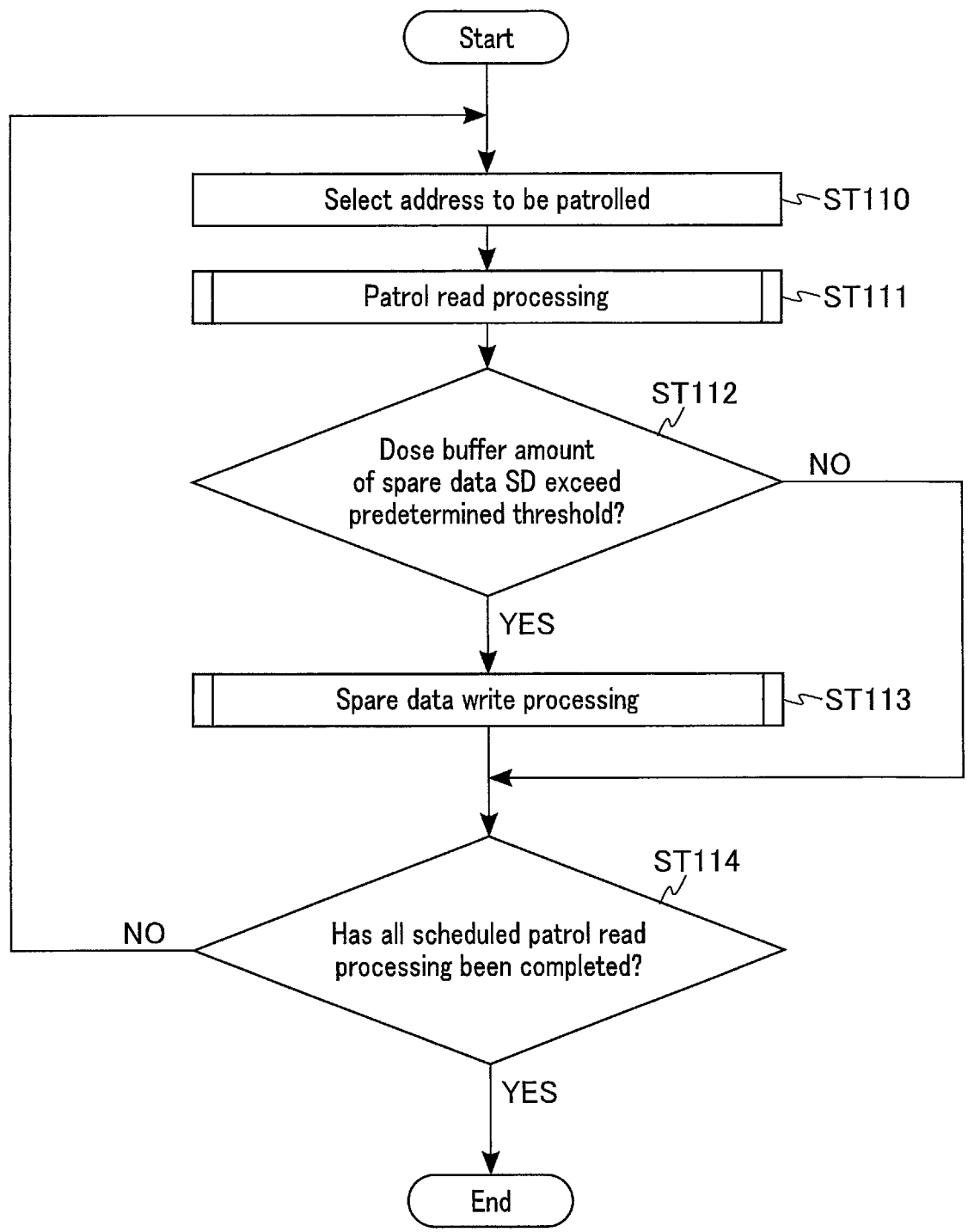
FIG. 9 is a flowchart showing an example of a patrol operation of the memory system according to the first embodiment.

FIG. 9 is a flowchart showing an example of the patrol operation of the memory system 1 according to the first embodiment. Hereinafter, a flow of the patrol operation of the memory system 1 according to the first embodiment will be described with reference to FIG. 9.

For example, in a case where the memory system 1 is in an idle state, the memory controller 20 starts the patrol operation based on a predetermined schedule (Start).

First, the memory controller 20 selects an address to be patrolled (ST110). The address to be patrolled is, for example, all pages in all the blocks BLK. The present invention is not limited thereto, and a representative page extracted from each of the blocks BLK may be selected as the address to be patrolled. The setting of the address to be patrolled may be changed for each period in which the patrol operation is executed.

Next, the memory controller 20 executes patrol read processing (ST111). The patrol read processing is processing of confirming whether or not it is possible to read a page targeted for the patrol operation. The patrol read processing is executed with reference to a history table. The history table retains, for example, for each of the word lines WL, information indicating whether or not the patrol read processing has been executed during the patrol period. The history table may be stored in a region that can be referred to by at least the CPU 21, and is stored in, for example, the RAM 24. Details of the patrol read processing will be described later.

Next, the memory controller 20 confirms whether or not a buffer amount of the spare data SD exceeds a predetermined threshold (ST112). The predetermined threshold is set according to the size of the buffer memory 23, for example. As the predetermined threshold, for example, a value at which a total size of the plurality of spare data SD is at least one or more pages is set.

In the processing of ST112, in a case where the buffer amount of the spare data SD does not exceed the predetermined threshold (ST112: NO), the memory controller 20 proceeds to the processing of ST114.

In the processing of ST112, in a case where the buffer amount of the spare data SD exceeds the predetermined threshold (ST112: YES), the memory controller 20 executes spare data write processing (ST113). The spare data write processing is processing of writing the plurality of spare data SD in units of pages. Details of the spare data write processing will be described later. If the processing of ST113 is completed, the memory controller 20 proceeds to the processing of ST114.

In the processing of ST114, the memory controller 20 checks whether or not all the scheduled patrol read processing has been completed.

In the processing of ST114, in a case where all the scheduled patrol read processing has not been completed (ST114: NO), the memory controller 20 proceeds to the processing of ST110. That is, the memory controller 20 selects an address to be patrolled next and executes the patrol read processing, and appropriately executes the spare data write processing based on the buffer amount of the spare data SD.

In the processing of ST114, in a case where all the scheduled patrol read processing has been completed (ST114: YES), the memory controller 20 ends the series of processing of FIG. 9 (End).

<1-2-3> Patrol Read Processing

Figure 10:
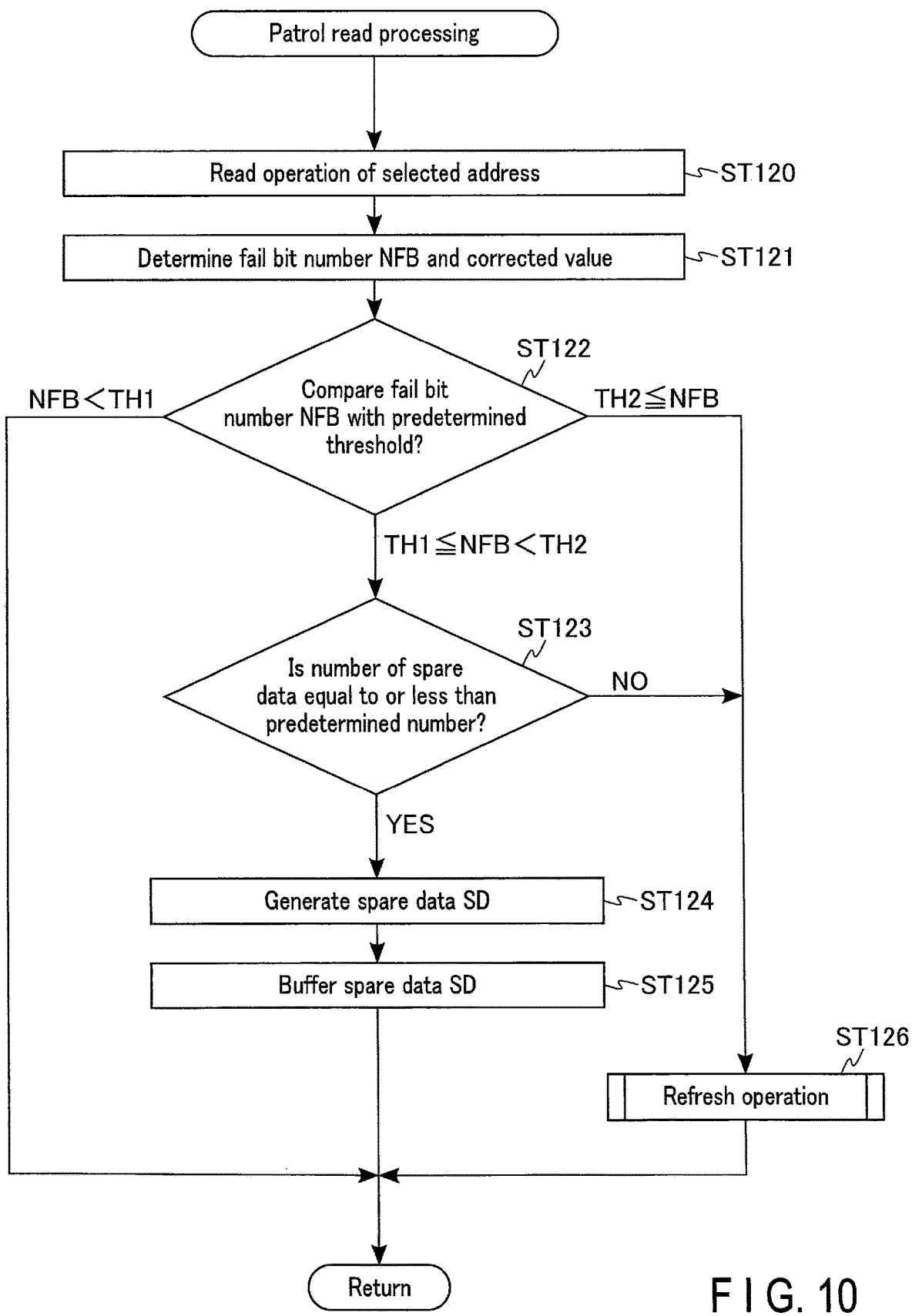
FIG. 10 is a flowchart showing an example of patrol read processing of the memory system according to the first embodiment.

FIG. 10 is a flowchart showing an example of the patrol read processing of the memory system 1 according to the first embodiment. Hereinafter, a flow of the patrol read processing in the memory system 1 according to the first embodiment will be described with reference to FIG. 10.

If the patrol read processing is started, first, the memory controller 20 executes the read operation of the selected address (ST120). This selected address corresponds to the address selected by the processing of ST110 of FIG. 9. In the first embodiment, the read operation in the processing of ST120 corresponds to the read operation described with reference to FIG. 8.

Next, the memory controller 20 determines the number of fail bits NFB and a corrected value (ST121). The fail bit number NFB is determined according to the number of fail bits FB corrected by the error correction processing executed in the read operation. The corrected value corresponds to the value of the bit corrected by the error correction processing executed in the read operation. In the processing of ST121, the memory controller 20 also manages the address of each corrected bit.

Next, the memory controller 20 compares the fail bit number NFB with a predetermined threshold (ST122). In this example, "TH1" and "TH2" larger than "TH1" are used as the predetermined threshold used in the processing of ST122.

In the processing of ST122, in a case where the fail bit number NFB is smaller than TH1 (ST122: NFB<TH1), the memory controller 20 ends the series of processing of FIG. 10 (Return).

In the processing of ST122, in a case where the fail bit number NFB is equal to or larger than TH1 and smaller than TH2 (ST122: TH1≤NFB<TH2), the memory controller 20 proceeds to the processing of ST123.

In the processing of ST122, in a case where the fail bit number NFB is equal to or larger than TH2 (ST122: TH2≤NFB), the memory controller 20 proceeds to the processing of ST126.

In the processing of ST123, the memory controller 20 confirms whether or not the number of spare data (that is, the number of spare data SD associated with the selected address) is equal to or less than a predetermined number.

In the processing of ST123, in a case where the number of spare data is not equal to or less than the predetermined number (ST123: NO), the memory controller 20 proceeds to the processing of ST126.

In the processing of ST123, in a case where the number of spare data is equal to or less than the predetermined number (ST123: YES), the memory controller 20 proceeds to the processing of ST124.

In the processing of ST124, the memory controller 20 generates the spare data SD. Specifically, the memory controller 20 generates the spare data SD including information of at least one set of the correction data CD and the column address CA based on the corrected value determined in the processing of ST121.

If the processing of ST124 is completed, the memory controller 20 buffers the spare data SD (ST125). Specifically, for example, the memory controller 20 stores the spare data SD including the correction data CD and the column address CA in the buffer memory 23. If the processing of ST125 is completed, the memory controller 20 ends the series of processing of FIG. 10 (Return).

In the processing of ST126, the memory controller 20 executes the refresh operation. The refresh operation includes an operation of writing the corrected read data to another page. Details of the refresh operation will be described later. If the processing of ST126 is completed, the memory controller 20 ends the series of processing of FIG. 10 (Return).

The patrol read processing is preferably executed for all bits in a case where the memory cell transistor MT stores a plurality of bit data. That is, for example, in the case of 2 bit/cell or more, the memory controller 20 executes the read operation of each of the plurality of pages corresponding to the plurality of bit data in the processing of ST120. At this time, the memory system 1 may sequentially read data of a plurality of pages stored in the same cell unit CU.

<1-2-4> Spare Data Write Processing

Figure 11:
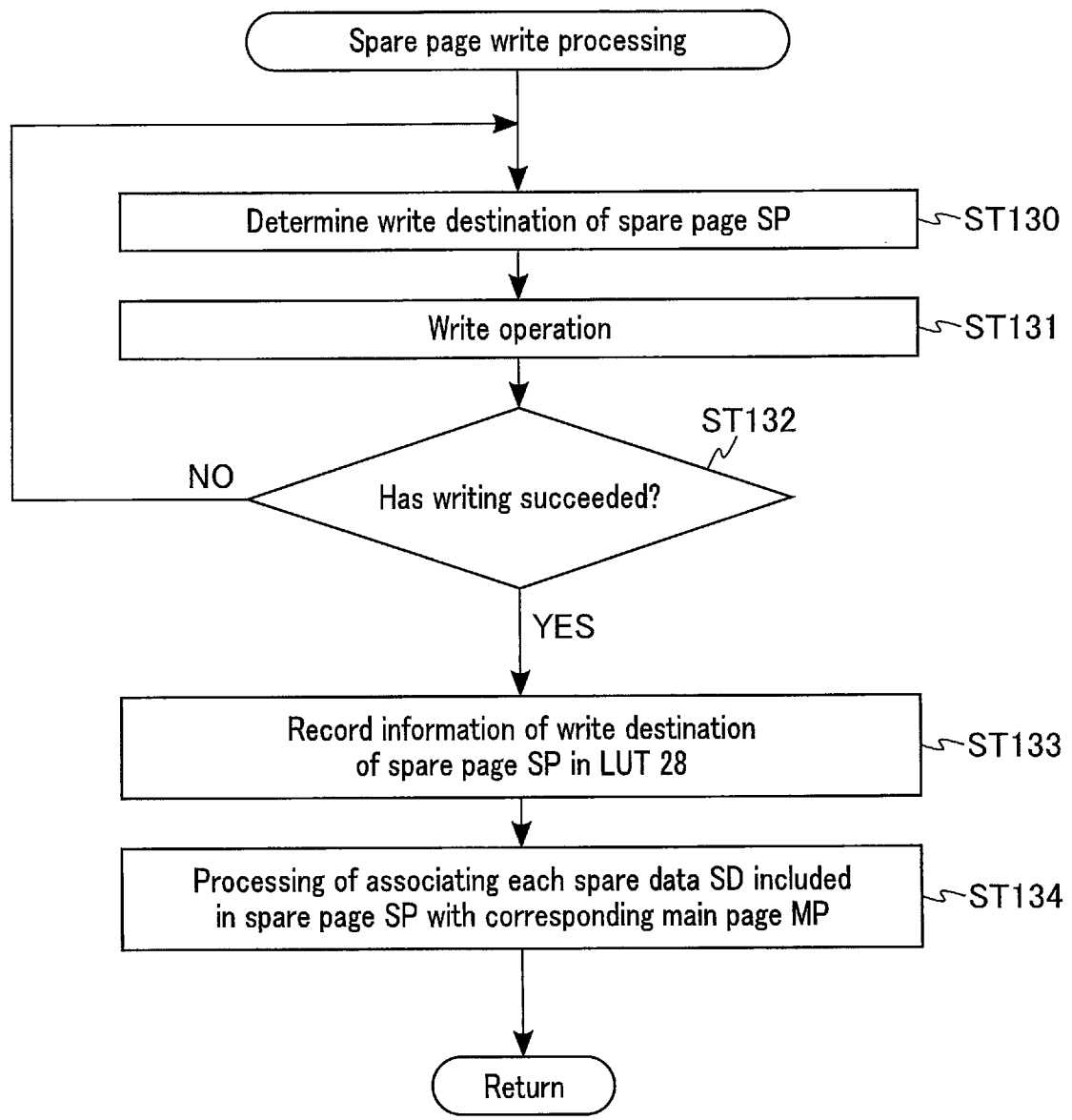
FIG. 11 is a flowchart showing an example of spare data write processing of the memory system according to the first embodiment.

FIG. 11 is a flowchart showing an example of the spare data write processing in the memory system 1 according to the first embodiment. Hereinafter, a flow of the spare data write processing in the memory system 1 according to the first embodiment will be described with reference to FIG. 11.

If the spare data write processing is started (Start), first, the memory controller 20 determines a write destination of the spare page SP including the plurality of spare data SD (ST130).

Next, the memory controller 20 instructs the memory device MD of the determined write destination to execute the write operation (ST131).

Next, the memory controller 20 confirms whether or not writing has succeeded in the processing of ST131 (ST132).

In the processing of ST132, in a case where writing is not successful (ST132: NO), the memory controller 20 proceeds to the processing of ST130. That is, the memory controller 20 changes the address of the write destination and executes the write operation of the spare page SP.

In the processing of ST132, in a case where writing has succeeded (ST132: YES), the memory controller 20 records information of the write destination of the spare page SP in the LUT 28 (ST133).

Next, the memory controller 20 executes association processing between each spare data SD included in the spare page SP and the corresponding main page MP (ST134). In the processing of ST134, the memory controller 20 records information in which each spare data SD is associated with the corresponding main page MP in the LUT 28.

Figure 12:
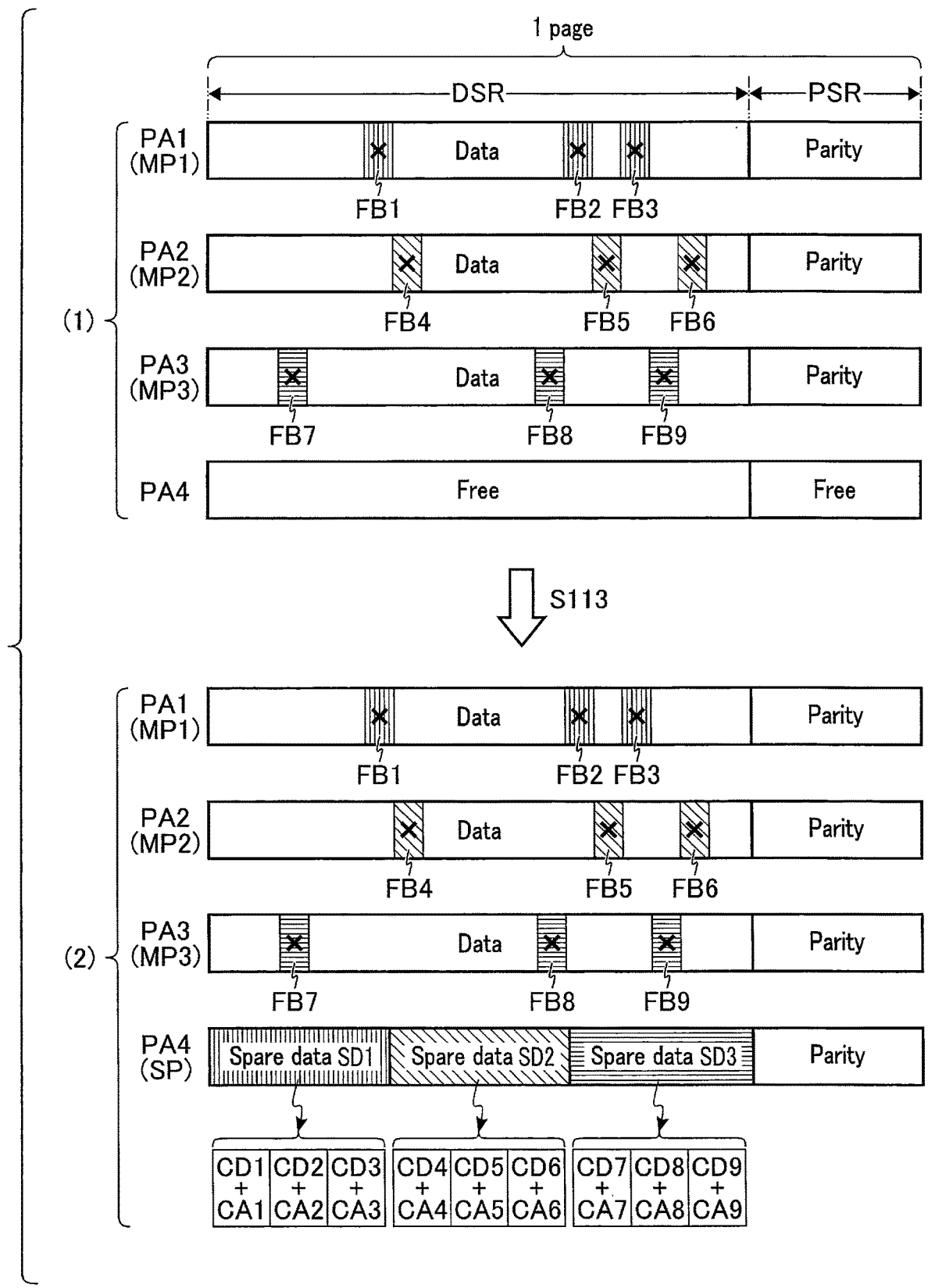
FIG. 12 is a schematic diagram showing a specific example of spare data write processing of the memory system according to the first embodiment.

FIG. 12 is a schematic diagram showing a specific example of the spare data write processing in the memory system 1 according to the first embodiment. (1) of FIG. 12 shows information stored in page addresses PA1 to PA4. As shown in (1) of FIG. 12, the page addresses PA1 to PA3 correspond to the main pages MP1 to MP3, respectively. The main page MP1 includes the fail bits FB1 to FB3. The main page MP2 includes the fail bits FB4 to FB6. The main page MP3 includes the fail bits FB7 to FB9. In the page address PA4, each of the data region DSR and the parity region PSR is in a free state. In a case where TH1=3, the memory controller 20 generates and buffers the spare data SD of each of the main pages MP1 to MP3. If the spare data write processing is executed by the processing of ST113, (1) of FIG. 12 transits to the state of (2) of FIG. 12.

As shown in (2) of FIG. 12, in this example, the spare page SP is written to the page address PA4. The spare data SD1 to SD3 corresponding to the main pages MP1 to MP3, respectively, are stored in the data region DSR of the page address PA4. The parity generated based on the spare data SD1 to SD3 is stored in the parity region PSR of the page address PA4. The spare data SD1 includes the correction data CD and the column address (that is, CD1+CA1, CD2+CA2, and CD3+CA3) corresponding to the fail bits FB1 to FB3. The spare data SD2 includes the correction data CD and the column address (that is, CD4+CA4, CD5+CA5, and CD6+CA6) corresponding to the fail bits FB4 to FB6. The spare data SD3 includes the correction data CD and the column address (that is, CD7+CA7, CD8+CA8, and CD9+CA9) corresponding to the fail bits FB7 to FB9.

Figure 13:
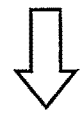
FIG. 13 is a schematic diagram showing an example of a change of the LUT due to the spare data write processing in the memory system according to the first embodiment.

FIG. 13 is a schematic diagram showing an example of a change of the LUT 28 due to the spare data write processing in the memory system 1 according to the first embodiment, and illustrates the change of the LUT 28 before and after generation of the spare data SD. (1) of FIG. 13 shows a case where "LBA=100", "Chip address=MD0", "Block address=BLK1", "Page address=PA1", and "Column address=CAxx" are stored in the entry with ID=2 in the LUT 28, and the columns of "Use spare" and "Spare ID" are empty. The entry with ID=55 is in an unused state.

If the spare data write processing is executed by the processing of ST133 and ST134, the LBA 28 shown in (1) of FIG. 13 is updated to the state of (2) of FIG. 13. As shown in (2) of FIG. 13, in this example, the address information of the spare data SD associated with the entry with ID=2 is stored in ID=55. In this case, "Use spare=o" and "Spare ID=55" are recorded in the entry with ID=2. Then, in the entry with ID=55, "LBA=100", "Chip address=MD1", "Block address=BLK2", "Page address=PA4", and "Column address=CAyy" are stored. As described above, in this example, the same LBA is recorded with the entry of the main page MP and the entry of the spare page SP, and the other pieces of address information are different.

<1-2-5> Refresh Operation

Figure 14:
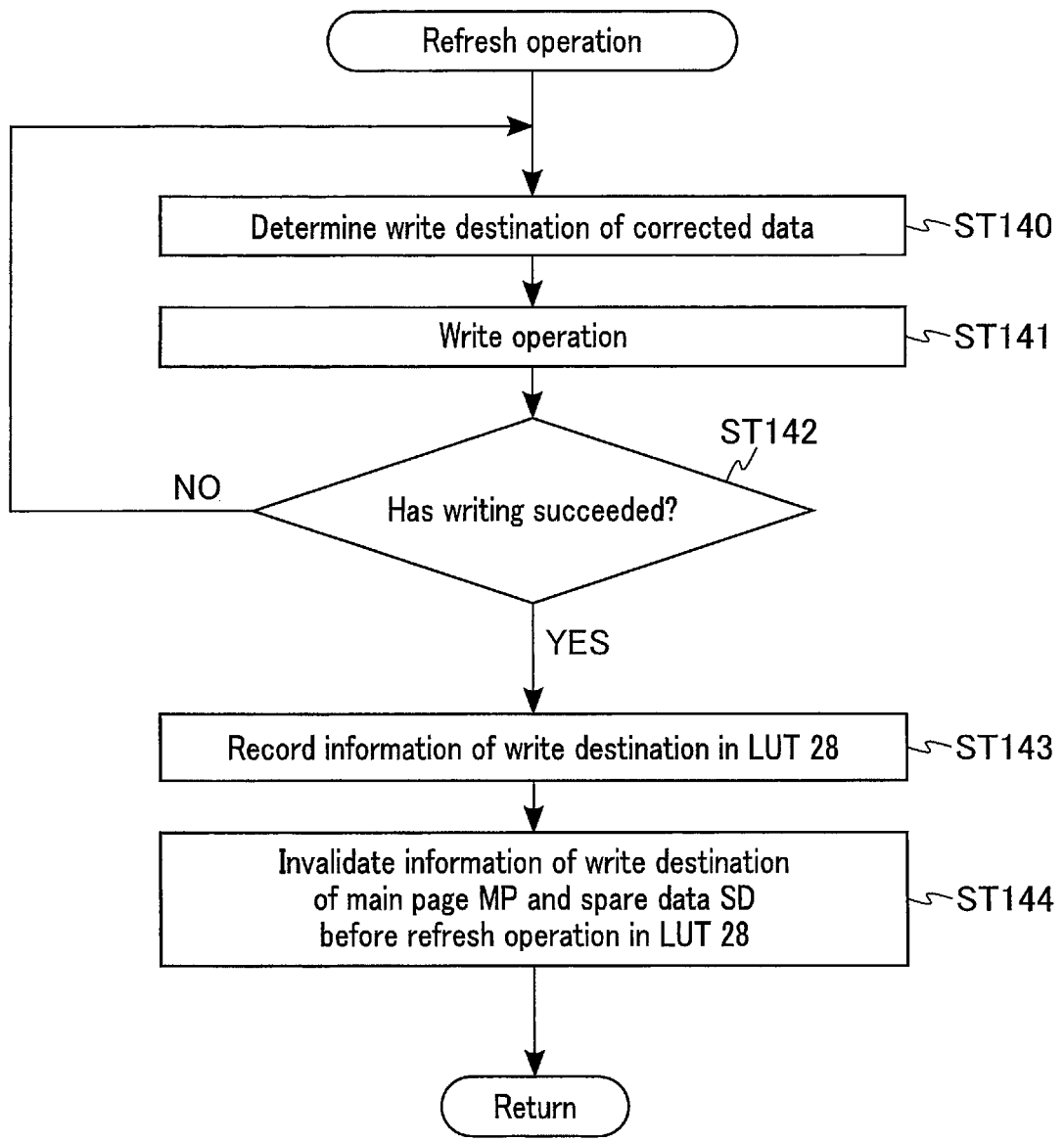
FIG. 14 is a flowchart showing an example of a refresh operation of the memory system according to the first embodiment.

FIG. 14 is a flowchart showing an example of the refresh operation of the memory system 1 according to the first embodiment. Hereinafter, a flow of the refresh operation of the memory system 1 according to the first embodiment will be described with reference to FIG. 14.

If the refresh operation starts (Start), first, the memory controller 20 determines the write destination of the corrected data (ST140).

Next, the memory controller 20 instructs the memory device MD of the determined write destination to execute the write operation (ST141).

Next, the memory controller 20 confirms whether or not writing has succeeded in the processing of ST141 (ST142).

In the processing of ST142, in a case where writing is not successful (ST142: NO), the memory controller 20 proceeds to the processing of ST140. That is, the memory controller 20 changes the address of the write destination and executes the write operation of the corrected data.

In the processing of ST142, in a case where writing has succeeded (ST142: YES), the memory controller 20 records information of the write destination of the corrected data in the LUT 28 (ST143).

Next, the memory controller 20 invalidates the information of the write destination of the main page MP and the spare data SD before the refresh operation in the LUT 28 (ST144).

FIG. 15 is a schematic diagram showing an example of a change of the LUT 28 due to the refresh operation of the memory system 1 according to the first embodiment, and illustrates the change of the LUT 28 before and after the refresh operation of the first embodiment. In the LBA 28 shown in (1) of FIG. 15, the same information as the information shown in (2) of FIG. 13 is stored in the entry with ID=2 and the entry with ID=55. The entry with ID=70 is in the unused state.

If the refresh operation is executed by the processing of ST143 and ST144, the LBA 28 shown in (1) of FIG. 15 is updated to the state of (2) of FIG. 15. As shown in (2) of FIG. 15, in this example, the address information of the write destination of the data corresponding to LBA=100 for which the refresh operation has been executed is stored in the entry with ID=70. The entry with ID=70 is validated ("Valid=o"), and the entry with ID=2 corresponding to the main page MP and the entry with ID=55 corresponding to the spare page SP are invalidated ("Valid=x"). In a case where the column of "Valid" is set to be invalid in a certain entry, the memory controller 20 also recognizes that the column of "Use spare" is also invalid in the entry. Thus, the column of "Use spare" in the invalidated entry may or may not be updated with information indicating invalidation.

<1-3> Effects of First Embodiment

According to the memory system 1 according to the first embodiment described above, reliability of the memory device MD can be enhanced. Hereinafter, the details of the effects of the first embodiment will be described.

The NAND-type flash memory is a low-cost nonvolatile memory, and is used as a large-capacity storage in various applications. As a method of suppressing the cost of the NAND-type flash memory, a multi-value technology is used. The multi-value technology is a technology for storing the plurality of bit data in one memory cell transistor MT. As described with reference to FIG. 4, for example, 7 bits/cell can be realized by increasing the number of states of the threshold voltage distribution of the memory cell transistor MT.

On the other hand, the error of the data read from the memory cell transistor MT tends to increase with the lapse of time. The influence of such data retention characteristics increases as the number of bits of data stored in the memory cell transistor MT increases, that is, as multi-value conversion is performed. In the memory system, the refresh operation is executed as a measure against data retention. The refresh operation is an operation of rewriting into a new block BLK before valid data written in the memory device cannot be read due to data retention. The memory system executes the patrol operation at a predetermined cycle, for example, as a trigger for executing the refresh operation.

Then, in the patrol operation, the memory system detects a page including many fail bits and executes the refresh operation of the page.

However, in the refresh operation, although valid data can be retained, the number of times of writing and erasing (W/E) increases, which may cause wear (deterioration of data retention characteristics) of the memory cell transistor MT. For example, the specification of the number of times of W/E of the memory cell transistor MT is, for example, several thousand times at 4 bit/cell. On the other hand, the specification of the number of times of W/E in the case of 5 bit/cell and 6 bit/cell is, for example, about several hundred times. The specification of the number of times of W/E in the case of 7 bit/cell is, for example, about several ten times. As described above, the increase in the number of times of W/E due to the refresh operation has a greater influence on the life of the memory system 1 as multi-value conversion is performed. Therefore, in order to store more data in the memory cell transistor MT, the number of times of the refresh operations is preferably reduced.

Thus, the memory system 1 according to the first embodiment generates the spare data SD capable of correcting the detected fail bit FB according to the fail bit number NFB detected by the patrol read processing. Then, the memory system 1 collectively writes the plurality of spare data SD generated corresponding to the plurality of pages into a free page different from the page storing the valid data. In other words, the memory system 1 executes the generation of the spare data SD and the spare data write processing before executing the refresh operation on a certain page having the fail bit FB in the patrol read processing.

The memory system 1 according to the first embodiment can correct data of a page in which the fail bit number NFB increases due to the data retention characteristics by using the spare data SD, and can acquire accurate data. In the memory system 1 according to the first embodiment, since a period until the refresh operation is executed by the spare data SD is extended, the number of times of W/E can be reduced. In addition, by generating the spare data SD and collectively storing the plurality of spare data SD in one page, it is possible to suppress an amount of data necessary for data correction and to improve use efficiency of a free region.

As described above, the memory system 1 according to the first embodiment can reduce the number of times of the refresh operations and can reduce a total number of times of W/E. As a result, the memory system 1 according to the first embodiment can maintain the reliability of data and extend the life of the memory cell transistor MT even in a case where the memory cell transistor MT is multi-valued such as 5 bit/cell to 7 bit/cell. Therefore, the memory system 1 according to the first embodiment can improve the reliability of the memory device MD, and can put multi-value conversion of 5 bit/cell or more into practical use.

<2> Second Embodiment

A memory system 1 according to a second embodiment generates spare data SD including a new parity in which the fail bit detected in a main page MP is considered. Hereinafter, details of the memory system 1 according to the second embodiment different from the first embodiment will be described.

<2-1> Configuration

A configuration of the memory system 1 according to the second embodiment is similar to that of the memory system 1 according to the first embodiment except for a configuration of a spare page SP, for example. Hereinafter, the configuration of the spare page SP in the second embodiment will be described.

Figure 16:
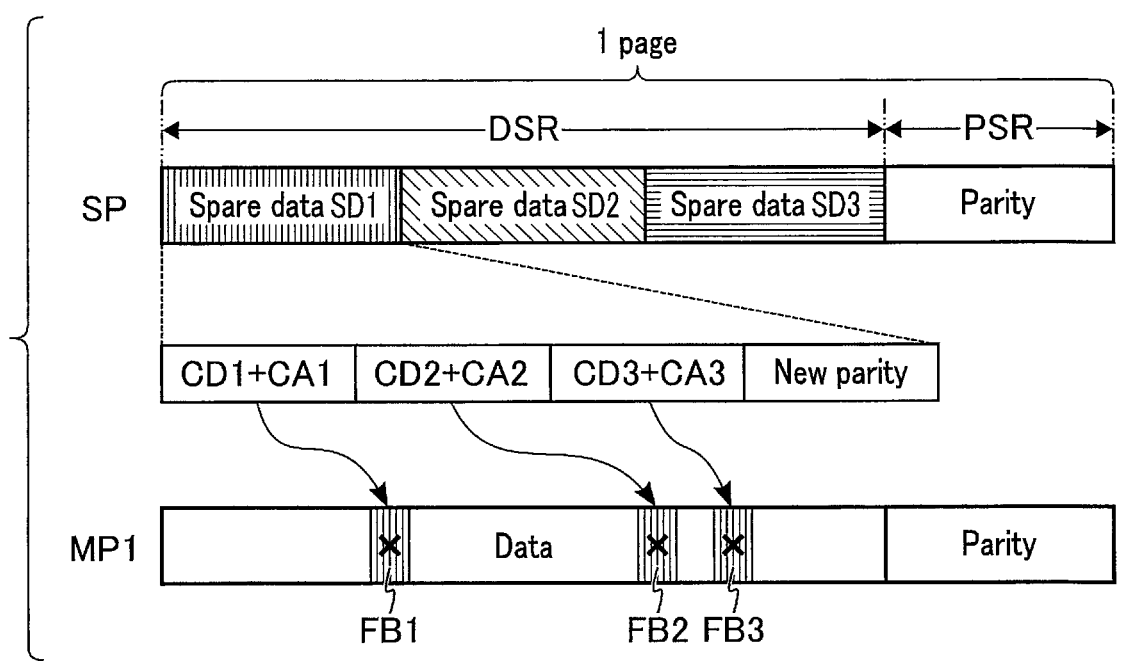
FIG. 16 is a schematic diagram showing an example of a configuration of a spare page in a memory system according to a second embodiment.

FIG. 16 is a schematic diagram showing an example of the configuration of the spare page SP in the memory system 1 according to the second embodiment. FIG. 16 illustrates a case where the spare page SP stores information associated with three main pages MP1 to MP3.

As shown in FIG. 16, a data region DSR of the spare page SP stores spare data SD1, SD2, and SD3. The parity region PSR of the spare page SP stores the parity generated based on the data stored in the data region DSR of the spare page SP. The spare data SD1, SD2, and SD3 are associated with the main pages MP1, MP2, and MP3, respectively. In the second embodiment, each spare data SD includes information used for correction of a fail bit FB detected in the associated main page MP, and a parity (hereinafter, referred to as a new parity) of the data region DSR of the main page MP in which the fail bit FB is detected.

FIG. 16 illustrates a case where fail bits FB1, FB2, and FB3 are detected by the ECC processing for the main page MP1. In this case, as in the first embodiment, the spare data SD1 includes a set (CD1+CA1) of correction data CD1 and a column address CA1 related to the fail bit FB1, a set (CD2+CA2) of correction data CD2 and a column address CA2 related to the fail bit FB2, and a set (CD3+CA3) of correction data CD3 and a column address CA3 related to the fail bit FB3. In the second embodiment, the spare data SD1 further includes the parity of the data region DSR of the main page MP1 in which the fail bit FB is detected.

Similarly to the spare data SD1, the spare data SD2 and SD3 may include information used for correction of the fail bit FB detected in the associated main page MP and the new parity. Each spare data SD may include information (set of the correction data CD and the column address CA) used for correction of at least one fail bit FB and the new parity of the data region DSR of the associated main page MP. If the position of the bit to be corrected can be specified, the correction data CD and the address information other than the column address CA may be combined. The number of associated fail bits FB may be different among a plurality of the spare data SD stored in the same page. In the second embodiment, the number of spare data SD included in the spare page SP is preferably plural.

<2-2> Operation

An operation of the memory system 1 according to the second embodiment is similar to that of the memory system 1 according to the first embodiment except for the read operation, for example. Hereinafter, the read operation in the second embodiment will be described.

Figure 17:
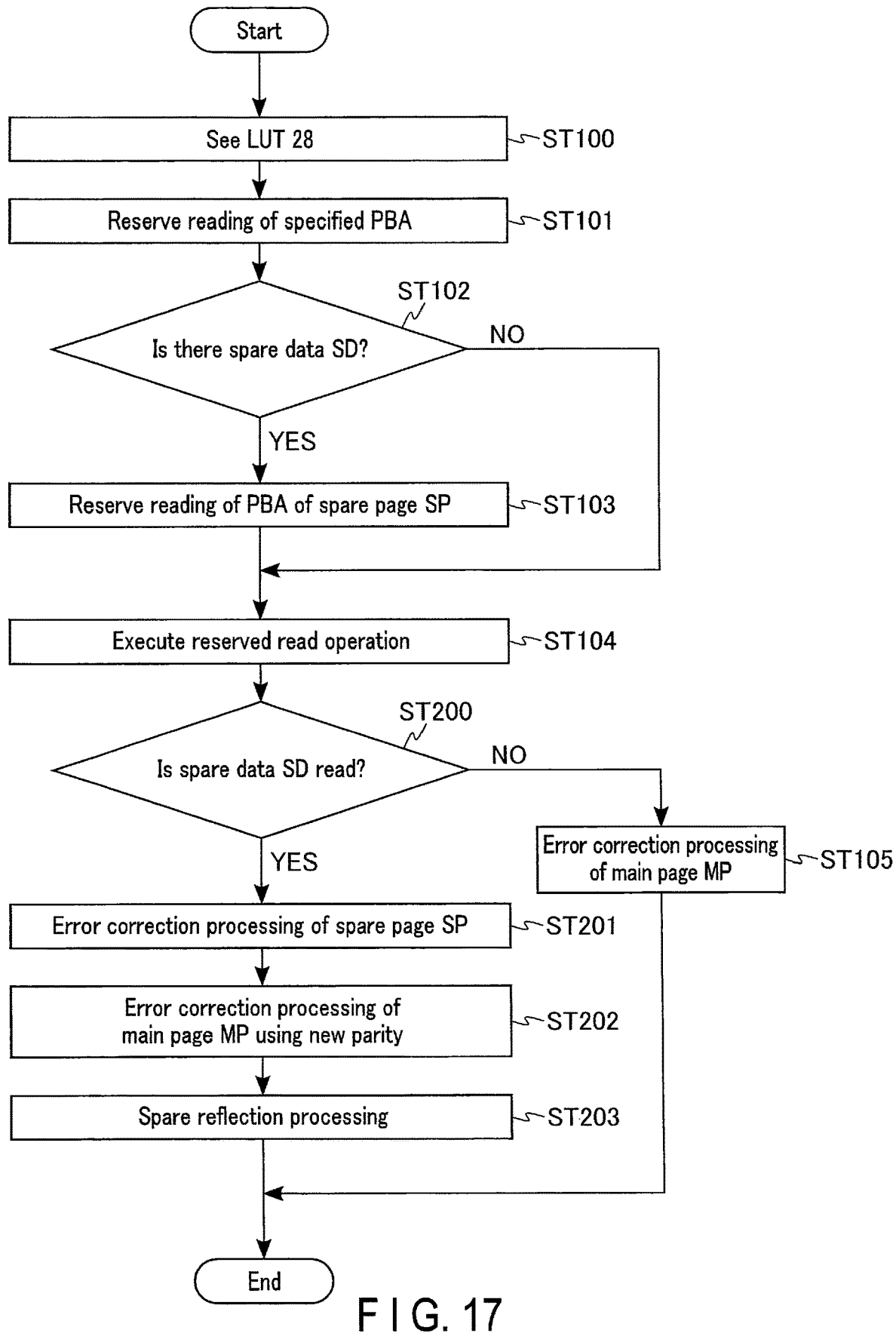
FIG. 17 is a flowchart showing an example of a read operation of the memory system according to the second embodiment.

FIG. 17 is a flowchart showing an example of the read operation of the memory system 1 according to the second embodiment. Hereinafter, a flow of the read operation of the memory system 1 according to the second embodiment will be described with reference to FIG. 17.

As in the first embodiment, for example, if receiving a read request from a host device 30, a memory controller 20 starts the series of processing of the read operation (Start).

First, as in the first embodiment, the memory controller 20 refers to an LUT 28 and searches for an entry corresponding to the logical address to be read (ST100).

Next, as in the first embodiment, the memory controller 20 reserves the read operation of the specified PBA (ST101).

Next, as in the first embodiment, the memory controller 20 confirms whether or not there is spare data SD from the specified entry (ST102).

In the processing of ST102, in a case where it is not confirmed that there is the spare data SD (ST102: NO), the memory controller 20 proceeds to the processing of ST104.

In the processing of ST102, in a case where it is confirmed that there is the spare data SD (ST102: YES), the memory controller 20 reserves the read operation of the PBA of the spare page SP as in the first embodiment (ST103). If the processing of ST103 is completed, the memory controller 20 proceeds to the processing of ST104.

In the processing of ST104, the memory controller 20 executes the reserved read operation as in the first embodiment.

Next, the memory controller 20 confirms whether or not the spare data SD is read in the processing of ST104 (ST200). In other words, the memory controller 20 confirms whether or not the processing of ST103 has been performed at the time of the processing of ST200.

In a case where the spare data SD is not read in the processing of ST104, that is, in a case where the read operation of the spare data SD is not executed (ST200: NO), the memory controller 20 executes the error correction (ECC) processing of the main page MP as in the first embodiment (ST105). If the error correction processing of ST105 succeeds, the memory controller 20 transmits, for example, the read data of the corrected main page MP to the host device 30, and ends the series of processing of the read operation (End).

In a case where the spare data SD is read in the processing of ST104, that is, in a case where the read operation of the spare data SD is executed (ST200: YES), the memory controller 20 executes the error correction (ECC) processing of the spare page SP (ST201). In this example, it is assumed that the error correction processing of ST201 succeeds.

If the processing of ST201 is completed, the memory controller 20 executes the error correction processing of the main page MP using the new parity (ST202). Specifically, the memory controller 20 executes the error correction processing of the read data corresponding to the data region DSR of the main page MP using the new parity included in the associated spare data SD in the spare page SP. In the processing of ST202, if error correction succeeds, the memory controller 20 can generate data including only the fail bit correctable by the correction data CD included in the spare data SD.

If the processing of ST202 is completed, the memory controller 20 executes spare reflection processing (ST203). That is, the memory controller 20 reflects the correction data CD included in the spare data SD extracted from the corrected spare page SP in the data generated in the processing of ST202 based on the associated column address CA. Then, the memory controller 20 transmits, for example, the data corrected by the spare data SD to the host device 30, and ends the series of processing in FIG. 17 (End).

In the above description, the case where the read operation is executed based on the request of the host device 30 has been exemplified; however, the present invention is not limited to this case. The read operation described above can also be applied to the read operation spontaneously executed by the memory controller 20. In this case, signal exchange between the memory controller 20 and the host device 30 is omitted.

FIG. 18 is a schematic diagram showing a specific example of the read operation of the memory system 1 according to the second embodiment. FIG. 18 shows an operation in a case where the data of the main page MP1 is read using the spare page SP shown in FIG. 16. As shown in FIG. 18, first, the memory controller 20 reads the main page MP1 and the spare page SP (S 104). Then, the memory controller 20 executes the error correction processing of the data stored in the data region DSR of the spare page SP by using the parity of the parity region PSR of the spare page SP by the processing of S 201. As a result, the memory controller 20 can acquire the spare data SD1 associated with the main page MP1 and including at least one correction data CD and the new parity.

Thereafter, the memory controller 20 executes the error correction processing of the data stored in the data region DSR of the main page MP1 by using the new parity included in the spare data SD1 by the processing of S 202. In this case, the parity stored in the parity region PSR of the main page MP1 is invalidated. Then, the memory controller 20 can acquire data including the fail bits FB1 to FB3. Then, the memory controller 20 reflects the correction data CD1 to CD3 included in the spare data SD1 in the data acquired by the processing of S 202 based on the column addresses CA1 to CA3, respectively, by the processing of S 203. As a result, the memory controller 20 can acquire data in which the fail bits FB1 to FB3 are replaced with the correction data CD1 to CD3, respectively, that is, data not including the fail bit FB.

<2-3> Effects of Second Embodiment

The memory system 1 according to the second embodiment can improve the reliability of the memory device MD as in the first embodiment. Since the number of times of the error correction processing is smaller in the memory system 1 according to the second embodiment than in the first embodiment, the read operation can be made faster than that of the first embodiment.

<3> Third Embodiment

A memory system 1 according to a third embodiment stores the spare data SD described in the first embodiment in a surplus region of a main page MP. Hereinafter, details of the memory system 1 according to the third embodiment different from the first embodiment will be described.

<3-1> Configuration

A configuration of the memory system 1 according to the third embodiment is similar to that of the memory system 1 according to the first embodiment except for a page configuration and a configuration of an LUT 28, for example. Hereinafter, the configuration of the page and the configuration of the LUT 28 in the third embodiment will be described in order.

<3-1-1> Configuration of Page

In the memory system 1 according to the third embodiment, the set of the main page MP and the spare page SP described in the first embodiment is stored in the same one page.

FIG. 19 is a schematic diagram showing an example of a configuration of one page in the memory system 1 according to the third embodiment. As shown in FIG. 19, one page in the third embodiment includes, for example, a data region DSR, a parity region PSR, and a spare region SSR. The spare region SSR is a region in which data related to the spare data SD can be stored. The spare region SSR is empty (blank) in the page associated with the LBA in which the spare data SD is not generated. On the other hand, the spare region SSR includes the spare data SD of the page associated with the LBA in which the spare data SD is generated.

FIG. 20 is a schematic diagram showing an example of a configuration of information stored in one page in the memory system 1 according to the third embodiment. FIG. 20 illustrates a case where data and the spare data SD associated with the data are stored in one page.

As shown in FIG. 20, the data region DSR in the third embodiment stores (user) data. The parity region PSR in the third embodiment stores a parity (hereinafter, referred to as "first parity") generated based on the data stored in the data region DSR. The spare region SSR stores the spare data SD. The spare data SD in the third embodiment includes information used for correction of the fail bit FB detected in the associated data and a parity (hereinafter, referred to as "second parity") generated based on the information.

FIG. 20 illustrates a case where fail bits FB1, FB2, and FB3 are detected by the ECC processing for the data stored in the data region DSR. In this case, as in the first embodiment, the spare data SD includes a set (CD1+CA1) of correction data CD1 and a column address CA1 related to the fail bit FB1, a set (CD2+CA2) of correction data CD2 and a column address CA2 related to the fail bit FB2, a set (CD3+CA3) of correction data CD3 and a column address CA3 related to the fail bit FB3, and the second parity.

In the third embodiment, two or more pieces of spare data SD may be stored in the spare region SSR. If the position of the bit to be corrected can be specified, the correction data CD and the address information other than the column address CA may be combined. The number of associated fail bits FB may be different among a plurality of the spare data SD stored in the same page.

<3-1-2> Configuration of LUT 28

FIG. 21 is a table showing an example of the configuration of the LUT 28 in the memory system 1 according to the third embodiment. As shown in FIG. 21, the LUT 28 in the third embodiment includes, for example, "ID (identifier)", "LBA", "Valid", "PBA", "Use spare", and "Spare address" as items (columns). Each of "ID (identifier)", "LBA", "Valid", "PBA", and "Use spare" in the third embodiment is similar to the LUT 28 in the first embodiment. "Spare address" indicates address information in which the spare data SD is stored in a case where the spare data SD associated with the LBA of the entry is generated. The spare address is, for example, a column address.

In this example, "Spare address=CAxy" is recorded in the entry of "ID=2". The CAxy is different from the column address CAxx of the PBA of the data indicated in the entry of "ID=2". That is, the memory controller 20 can specify each storage position of the data and the spare data SD stored in the same page based on the PBA of the data and the spare address of the spare data SD in the entry in which "o" is stored in "Use spare". As the spare address, other information may be used as long as the storage position of the spare data SD can be specified.

In the LUT 28, a format in which the data and the spare data SD are associated with each other is not limited thereto. The format of the LUT 28 may be able to manage at least information of the data and information of the spare data SD in association with each other. Information on whether the plurality of spare data SD are used and information on the spare addresses of the plurality of spare data SD may be stored in the entry of the page. The memory controller 20 may individually include the LUT 28 associated with the data and the LUT 28 associated with the spare data SD. In this case, the LUT 28 associated with the spare data SD includes the spare address associated with the spare data SD, and the chip address, the block address, and the page address of the PBA associated with the data.

<3-2> Operation

An operation of the memory system 1 according to the third embodiment is similar to that of the memory system 1 according to the first embodiment except for the read operation and the spare data write processing, for example. Hereinafter, the read operation and the spare data write processing in the third embodiment will be described in order.

<3-2-1> Read Operation

FIG. 22 is a flowchart showing an example of the read operation of the memory system 1 according to the third embodiment. Hereinafter, a flow of the read operation of the memory system 1 according to the first embodiment will be described with reference to FIG. 22.

As in the first embodiment, for example, if receiving a read request from a host device 30, a memory controller 20 starts the series of processing of the read operation (Start).

First, as in the first embodiment, the memory controller 20 refers to an LUT 28 and searches for an entry corresponding to the logical address to be read (ST100).

Next, as in the first embodiment, the memory controller 20 reserves the read operation of the specified PBA (ST101).

Next, as in the first embodiment, the memory controller 20 confirms whether or not there is spare data SD from the specified entry (ST102).

In the processing of ST102, in a case where it is not confirmed that there is the spare data SD (ST102: NO), the memory controller 20 proceeds to the processing of ST301.

In the processing of ST102, in a case where it is confirmed that there is the spare data SD (ST102: YES), the memory controller 20 reserves the read operation of the PBA of the spare page SP, that is, the spare address of the spare page SP (ST300). Specifically, in the processing of ST300, the memory controller 20 adds the column address to be read to the read operation reserved in ST101. If the processing of ST300 is completed, the memory controller 20 proceeds to the processing of ST301.

In the processing of ST301, the memory controller 20 executes the reserved read operation. Specifically, the memory controller 20 transmits the command and the address information based on the reserved read operation to the memory device MD including the page to be read. Then, the memory device MD reads the data from the page designated by the address information based on the received command and address information. Then, the memory device MD transmits the read data to the memory controller 20. The memory controller 20 stores the data received from the memory device MD in the buffer memory 23.

Next, the memory controller 20 executes the error correction (ECC) processing of the data region DSR (ST302). In other words, in the processing of ST302, the memory controller 20 executes the error correction processing of the data read from the data region DSR using the parity read from the parity region PSR.

Next, the memory controller 20 confirms whether or not error correction has failed in the processing of ST302 (ST303).

In a case where the error correction has not failed, that is, in a case where the error correction has succeeded (ST303: NO), the memory controller 20 transmits, for example, data corrected by the processing of ST302 to the host device 30, and ends the series of processing of the read operation (End).

In a case where the error correction has failed (ST303: YES), the memory controller 20 executes the error correction processing for the spare region SSR read by the processing of ST301 (ST304). In other words, in the processing of ST304, the memory controller 20 executes the error correction processing of the correction data CD and the column address CA included in the spare data SD by using the parity included in the spare data SD read from the spare region SSR. In this example, it is assumed that the error correction processing of ST304 succeeds.

If the processing of ST304 is completed, the memory controller 20 executes spare reflection processing (ST305). In the processing of ST305, the memory controller 20 reflects the correction data CD included in the corrected spare data SD in the data read from the data region DSR in the processing of ST301 based on the associated column address CA.

If the processing of ST305 is completed, the memory controller 20 executes the re-error correction processing of the data region DSR (ST306). Specifically, in the re-error correction processing, the memory controller 20 executes the error correction processing using the parity of the parity region PSR on the read data of the data region DSR on which the correction data CD is reflected. In a case where the error correction processing has succeeded, the memory controller 20 transmits, for example, the corrected data to the host device 30, and ends the series of processing of the read operation (End).

In the above description, the case where the read operation is executed based on the request of the host device 30 has been exemplified; however, the present invention is not limited to this case. The read operation described above can also be applied to the read operation spontaneously executed by the memory controller 20. In this case, signal exchange between the memory controller 20 and the host device 30 is omitted.

In the third embodiment, the memory controller 20 may omit the processing of steps ST302 and ST303 in a case where the spare data SD is read. In this case, the memory controller 20 executes the processing of ST304 after the processing of ST301. As a result, the memory system 1 can omit the time required for the processing of ST302 and ST303, and can speed up the read operation as compared with the case of executing the processing of ST304 via the processing of ST302 and ST303.

<3-2-2> Spare Data Write Processing

FIG. 23 is a flowchart showing an example of the spare data write processing in the memory system 1 according to the third embodiment. Hereinafter, a flow of the spare data write processing in the memory system 1 according to the third embodiment will be described with reference to FIG. 23.

If the spare data write processing is started (Start), first, the memory controller 20 specifies a write destination page of the associated data (ST310).

Next, the memory controller 20 instructs the memory device MD of the write destination to execute the write operation, and executes the write operation in which the data region DSR and the parity region PSR are set to write inhibition (ST311).

Next, the memory controller 20 records creation of the spare data SD in the LUT 28 (ST312). If the processing of ST312 is completed, the memory controller 20 ends the series of processing of FIG. 23 (Return).

In the third embodiment, the memory controller 20 may execute the spare data write processing at the timing when the spare data SD is created, or may execute the spare data write processing at the timing when the spare data SD is buffered to some extent. In a case where the spare data write processing is executed at the timing when the spare data SD is created, the processing of ST125 is replaced with the spare data write processing.

FIG. 24 is a schematic diagram showing a specific example of the spare data write processing in the memory system 1 according to the third embodiment. (1) of FIG. 24 shows a state before the spare data write processing of the page corresponding to the page address PA1 and the corresponding threshold voltage distribution. As shown in (1) of FIG. 24, the data is stored in the data region DSR. The parity is stored in the parity region PSR. The spare region SSR is in a free state. In this case, the threshold voltage distribution of the plurality of memory cell transistors MT included in the set of the data region DSR and the parity region PSR forms a plurality of states S0 to S(N) (N is an integer of 1 or more). On the other hand, the threshold voltage distribution of the plurality of memory cell transistors MT included in the spare region SSR includes only the state S0.

If the spare data write processing is executed, the state of one page shown in (1) of FIG. 24 is updated to the state of (2) of FIG. 24. As shown in (2) of FIG. 24, if the spare data write processing is executed, the spare data SD is written in the spare region SSR of the page address am. That is, the states S0 to S(N) are formed in the threshold voltage distribution of the plurality of memory cell transistors MT included in the spare region SSR. On the other hand, the data region DSR and the parity region PSR are set to be inhibited from being written in the spare data write processing. Thus, the threshold voltage distribution of the plurality of memory cell transistors MT included in the data region DSR and the parity region PSR is prevented from varying from the state of (1) in FIG. 24.

FIG. 25 is a schematic diagram showing an example of a change of the LUT 28 due to the spare data write processing in the memory system 1 according to the third embodiment, and illustrates the change of the LUT 28 before and after the refresh operation. (1) of FIG. 25 shows a case where "LBA=100", "Chip address=MD0", "Block address=BLK1", "Page address=PA1", and "Column address=CAxx" are stored in the entry with ID=2 in the LUT 28, and the columns of "Use spare" and "Spare address" are empty.

If the spare data write processing is executed by the processing of ST312, the LBA 28 shown in (1) of FIG. 25 is updated to the state of (2) of FIG. 25. As shown in (2) of FIG. 25, in this example, "Use spare=o" and "Spate address=CAxy" are recorded in the entry with ID=2. The column addresses CAxx and CAxy indicate ranges of different sets of the memory cell transistors MT in the same page. Specifically, the column address CAxx corresponds to the positions of the data region DSR and the parity region PSR. The column address CAxy corresponds to the position of the spare region SSR.

<3-2-3> Refresh Operation

FIG. 26 is a schematic diagram showing an example of a change of the LUT 28 due to the refresh operation of the memory system 1 according to the third embodiment, and illustrates the change of the LUT 28 before and after the refresh operation in the third embodiment. In the LBA 28 shown in (1) of FIG. 26, the same information as the information shown in (2) of FIG. 25 is stored in the entry with ID=2. The entry with ID=70 is in the unused state.

If the refresh operation is executed by the processing of ST143 and ST144, the LBA 28 shown in (1) of FIG. 26 is updated to the state of (2) of FIG. 26. As shown in (2) of FIG. 26, in this example, the address information of the write destination of the data corresponding to LBA=100 for which the refresh operation has been executed is stored in the entry with ID=70. The entry with ID=70 is validated ("Valid=o"), and the entry with ID=2 corresponding to a page targeted for the refresh operation is invalidated ("Valid=x").

<3-3> Effects of Third Embodiment

The memory system 1 according to the third embodiment can improve the reliability of the memory device MD as in the first embodiment. Further, since the spare region SSR is secured in advance, the memory system 1 according to the third embodiment can simplify address management by the LUT 28 as compared with the first embodiment. Furthermore, since the memory system 1 according to the third embodiment can collectively read the data of the data region DSR and the spare data SD of the spare region SSR in the read operation of one page, the read operation can be made faster than that of the first embodiment.

<4> Fourth Embodiment

The memory system 1 according to the fourth embodiment stores the spare data SD described in the second embodiment in the spare region SSR of the page as in the third embodiment. Hereinafter, details of the memory system 1 according to the fourth embodiment different from the first to third embodiments will be described.

<4-1> Configuration

A configuration of the memory system 1 according to the fourth embodiment is similar to that of the memory system 1 according to the third embodiment except for a configuration of a page, for example. Hereinafter, the configuration of the page in the fourth embodiment will be described.

One page in the fourth embodiment includes a data region DSR, a parity region PSR, and a spare region SSR as in the third embodiment. FIG. 27 is a schematic diagram showing an example of a configuration of information stored in one page in the memory system 1 according to the fourth embodiment. FIG. 27 illustrates a case where data and the spare data SD associated with the data are stored in one page.

As shown in FIG. 20, the data region DSR in the fourth embodiment stores (user) data. The parity region PSR in the fourth embodiment stores a first parity. The spare region SSR in the fourth embodiment stores the spare data SD. The spare data SD in the fourth embodiment includes information used for correction of the fail bit FB detected in the associated data, a parity (hereinafter, referred to as "new parity") of the data in which the fail bit FB is detected in the associated data region DSR, and a parity (hereinafter, referred to as "second parity") generated based on the information and the new parity.

FIG. 20 illustrates a case where fail bits FB1, FB2, and FB3 are detected by ECC processing for a main page MP1. In this case, as in the first embodiment, the spare data SD1 includes a set (CD1+CA1) of correction data CD1 and a column address CA1 related to the fail bit FB1, a set (CD2+CA2) of correction data CD2 and a column address CA2 related to the fail bit FB2, a set (CD3+CA3) of correction data CD3 and a column address CA3 related to the fail bit FB3, and the spare data SD.

In the fourth embodiment, two or more pieces of spare data SD may be stored in the spare region SSR. In the correction data CD stored in each spare data SD, if the position of the bit to be corrected can be specified, the correction data CD and the address information other than the column address CA may be combined. The number of associated fail bits FB may be different among a plurality of the spare data SD stored in the same page.

<4-2> Operation

An operation of the memory system 1 according to the fourth embodiment is similar to that of the memory system 1 according to the third embodiment except for the read operation, for example. Hereinafter, the read operation in the fourth embodiment will be described.

Figure 28:
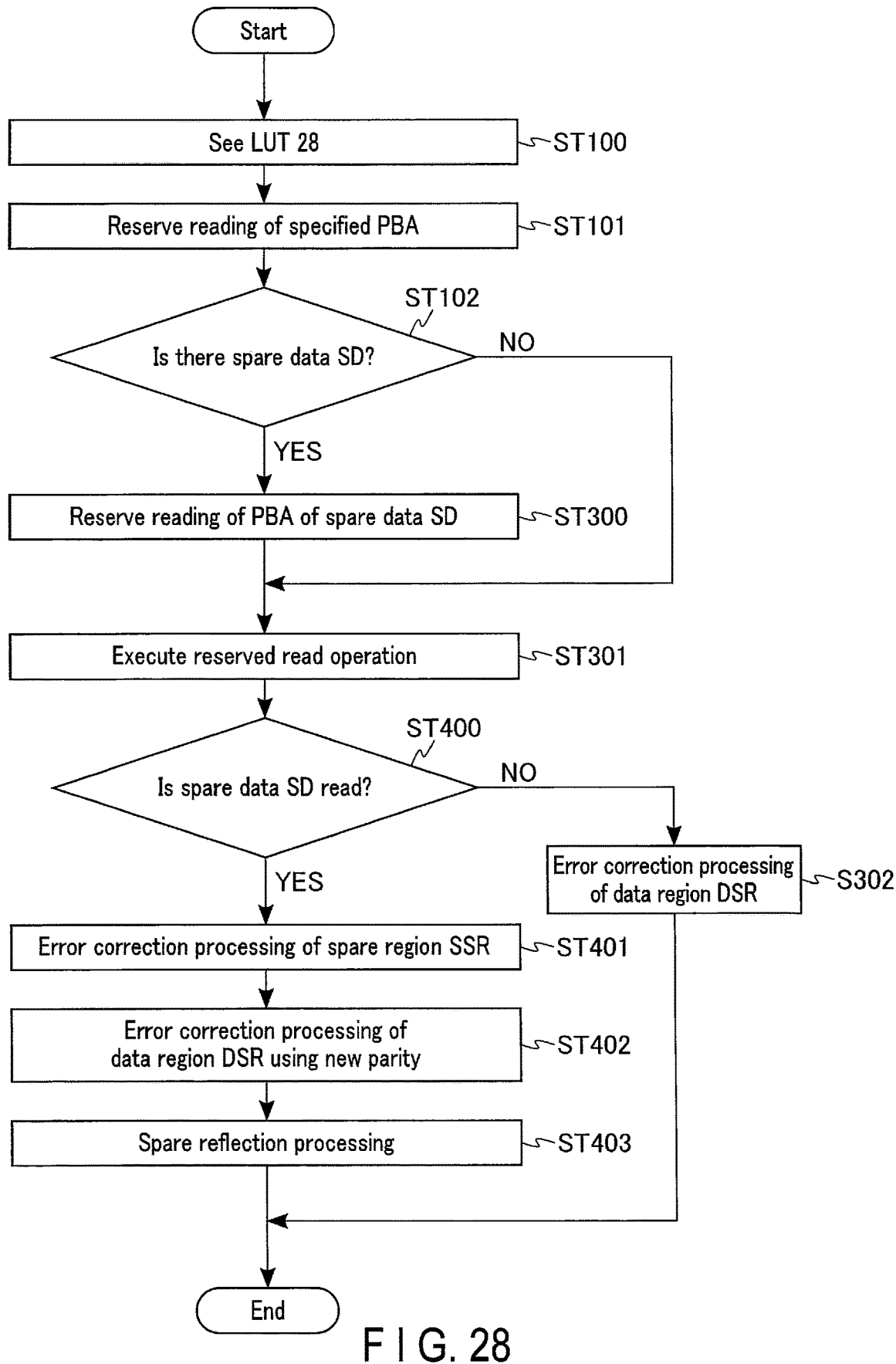
FIG. 28 is a flowchart showing an example of a read operation of the memory system according to the fourth embodiment.

FIG. 28 is a flowchart showing an example of the read operation of the memory system 1 according to the fourth embodiment. Hereinafter, a flow of the read operation of the memory system 1 according to the second embodiment will be described with reference to FIG. 28.

As in the first embodiment, for example, if receiving a read request from a host device 30, a memory controller 20 starts the series of processing of the read operation (Start).

First, as in the first embodiment, the memory controller 20 refers to an LUT 28 and searches for an entry corresponding to the logical address to be read (ST100).

Next, as in the first embodiment, the memory controller 20 reserves the read operation of the specified PBA (ST101).

Next, as in the first embodiment, the memory controller 20 confirms whether or not there is spare data SD from the specified entry (ST102).

In the processing of ST102, in a case where it is not confirmed that there is the spare data SD (ST102: NO), the memory controller 20 proceeds to the processing of ST301.

In the processing of ST102, in a case where it is confirmed that there is the spare data SD (ST102: YES), the memory controller 20 reserves the read operation of the PBA of the spare data SD as in the third embodiment (ST300). If the processing of ST300 is completed, the memory controller 20 proceeds to the processing of ST301.

In the processing of ST301, the memory controller 20 executes the reserved read operation as in the third embodiment.

Next, the memory controller 20 confirms whether or not the spare data SD is read in the processing of ST301 (ST400). In other words, the memory controller 20 confirms whether or not the processing of ST300 has been performed at the time of the processing of ST400.

In a case where the spare data SD is not read in the processing of ST400 (ST400: NO), the memory controller 20 executes the error correction (ECC) processing of the data region DSR as in the third embodiment (ST302). If the error correction processing of ST302 has succeeded, the memory controller 20 transmits, for example, the corrected data to the host device 30, and ends the series of processing of FIG. 28 (End).

In a case where the spare data SD is read in the processing of ST400 (ST700: YES), the memory controller 20 executes the error correction (ECC) processing of the spare region SSR (ST401). In this example, it is assumed that the error correction processing of ST401 succeeds.

If the processing of ST401 is completed, the memory controller 20 executes the error correction processing of the data region DSR using the new parity (ST402). Specifically, the memory controller 20 executes the error correction processing of the data read from the data region DSR by using the new parity included in the spare data SD. In the processing of ST402, if error correction succeeds, the memory controller 20 can generate data including only the fail bit correctable by the correction data CD included in the spare data SD.

If the processing of ST402 is completed, the memory controller 20 executes spare reflection processing (ST403). That is, the memory controller 20 reflects the correction data CD included in the corrected spare data SD in the data generated in the processing of ST402 based on the associated column address CA. Then, the memory controller 20 transmits, for example, the data corrected by the spare data SD to the host device 30, and ends the series of processing of the read operation (End).

In the above description, the case where the read operation is executed based on the request of the host device 30 has been exemplified; however, the present invention is not limited to this case. The read operation described above can also be applied to the read operation spontaneously executed by the memory controller 20. In this case, signal exchange between the memory controller 20 and the host device 30 is omitted.

FIG. 29 is a schematic diagram showing a specific example of the read operation of the memory system 1 according to the fourth embodiment. FIG. 29 shows an operation in a case where the data is read using the spare data SD shown in FIG. 27. As shown in FIG. 29, first, the memory controller 20 reads data stored in one page (S301). Then, the memory controller 20 executes the error correction processing of the information stored in the spare region SSR by using the second parity of the spare region SSR by the processing of S401. As a result, the memory controller 20 can acquire the correction data CD and the new parity of the page.

Thereafter, the memory controller 20 executes the error correction processing of the data stored in the data region DSR by using the new parity included in the spare data SD by the processing of S 402. In this case, the first parity stored in the parity region PSR is invalidated. Then, the memory controller 20 can acquire data including the fail bits FB1 to FB3. Then, the memory controller 20 reflects the correction data CD1 to CD3 included in the spare data SD in the data acquired by the processing of S 402 based on the column addresses CA1 to CA3, respectively, by the processing of S 403. As a result, the memory controller 20 can acquire data in which the fail bits FB1 to FB3 are replaced with the correction data CD1 to CD3, respectively, that is, data not including the fail bit FB.

In the fourth embodiment, in a case where the page includes the plurality of the spare data SD, the new parity included in the spare data SD stored last in the page corresponds to the parity for the data in which the information of the fail bit FB detected in the data region DSR is the latest. That is, in a case where the page includes the plurality of spare data SD, the memory controller 20 executes the error correction processing on the data in the data region DSR by using the new parity included in the spare data SD stored last in the processing of ST402. In the fourth embodiment, in a case where the plurality of spare data SD exist in the same page, all the correction data CD of the page may be stored in the last stored spare data SD, and information of the correction data CD may be stored such that the plurality of spare data SD do not overlap each other.

<4-3> Effects of Fourth Embodiment

The memory system 1 according to the fourth embodiment can improve the reliability of the memory device MD as in the first embodiment. Further, since the spare region SSR is secured in advance, the memory system 1 according to the fourth embodiment can simplify address management by the LUT 28 as compared with the first embodiment. Furthermore, since the number of times of the error correction processing is smaller in the memory system 1 according to the fourth embodiment than in the third embodiment, the read operation can be made faster than that of the third embodiment.

<5> Other

In this specification, an element including the input/output circuit 102, the logic control circuit 104, the sequencer 105, the ready/busy control circuit 106, and the driver circuit 107 may be referred to as a "controller" or a "control circuit". That is, the controller of the memory device MD can execute the write operation to the memory cell transistor MT based on the instruction from the external memory controller 20. The "connection" in this specification means electrical connection and does not exclude the fact that another element is interposed in the connection. In the present specification, the "off state" means that a voltage less than the threshold voltage of the corresponding transistor is applied to a gate of the transistor, and, for example, it does not exclude the fact that a minute current such as a leak current of the transistor flows. The memory set 10 may be referred to as a "nonvolatile memory device", a "nonvolatile memory", a "nonvolatile storage device", a "nonvolatile semiconductor storage device", or a "nonvolatile semiconductor memory". The parity used for error correction may be referred to as "parity bit", "parity code", or "parity data".

While certain embodiments have been described, these embodiments have been presented by way of example only, and are not intended to limit the scope of the inventions. The novel embodiments described herein may be embodied in a variety of other forms, and various omissions, substitutions, and changes may be made without departing from the spirit of the invention. These embodiments and modifications thereof are included in the scope and spirit of the invention, and also included in the invention described in the scope of claims and the scope of equivalents thereof.

What is claimed is:

1. A memory system comprising:
a nonvolatile semiconductor storage device including at least one memory device including a plurality of memory cells corresponding to a plurality of pages; and
a memory controller configured to control the nonvolatile semiconductor storage device, wherein
the pages include a first page, and
the memory controller is configured to:
read first data stored in the first page from the nonvolatile semiconductor storage device;
correct a fail bit included in the read first data;
generate first spare data including information on the fail bit corrected in the read first data; and
store the first spare data in the nonvolatile semiconductor storage device, wherein
in a read operation of the first page, the memory controller is configured to:
read the first data and the first spare data stored in the first page from the nonvolatile semiconductor storage device; and
correct the fail bit included in the read first data based on the first spare data.

2. The memory system of claim 1, wherein
the read first data includes second data including the fail bit and third data different from the second data,
the first spare data is generated based on the second data, and
the first spare data is not based on the third data.

3. The memory system of claim 1, wherein
the first spare data includes information of a corrected bit of the corrected fail bit and address information of the corrected fail bit.

4. The memory system of claim 1, wherein
the first spare data includes a parity generated using the read first data.

5. The memory system of claim 1, wherein
the pages include a second page different from the first page and storing the first spare data.

6. The memory system of claim 5, wherein
the nonvolatile semiconductor storage device includes a first memory device including the first page and a second memory device including the second page.

7. The memory system of claim 6, wherein
in a read operation of the first page, the memory controller is configured to execute reading of the first page by the first memory device and reading of the second page by the second memory device in parallel.

8. The memory system of claim 5, wherein
the pages include a third page, and
the memory controller is configured to:
read second data stored in the third page from the nonvolatile semiconductor storage device;
correct the fail bit included in the read second data;
generate second spare data including information on the corrected fail bit of the second data; and
store the second spare data in the second page when the first spare data is stored in the second page.

9. The memory system of claim 8, wherein
the second page includes a parity generated based on the first spare data and the second spare data.

10. The memory system of claim 1, wherein
the memory controller is configured to store the first spare data in the first page.

11. The memory system of claim 10, wherein
the memory device sets the memory cells in which the first data is stored to write inhibition in a write operation of storing the first spare data in the first page.

12. The memory system of claim 1, wherein
the memory controller is configured to:
periodically execute a read operation for each of the pages;
count the number of fail bits of each of the pages based on a correction result of read data; and
generate spare data including information on the fail bit based on the number of fail bits.

13. The memory system of claim 1, wherein
the memory controller is configured to generate the first spare data in a case where the number of fail bits included in the data of the read first page is equal to or more than a first threshold and less than a second threshold larger than the first threshold.

14. The memory system of claim 13, wherein
the memory controller does not generate the first spare data in a case where the number of fail bits included in the data of the read first page is less than the first threshold.

15. The memory system of claim 13, wherein
the pages include a fourth page, and
the memory controller is configured to store the corrected first data in the fourth page in a case where the number of fail bits included in the data of the read first page is equal to or more than the second threshold.

16. The memory system of claim 1, wherein the memory controller has a look-up table that associates a logical address received from an external host device with a physical address of the pages, and the look-up table includes a first entry including the physical address of the first page and the physical address of the first spare data associated with the first entry.

17. The memory system of claim 16, wherein the look-up table includes a second entry associated with the first entry, and the second entry includes the physical address of the first spare data.

18. The memory system of claim 16, wherein the first entry includes the physical address of the first spare data.

19. The memory system of claim 1, wherein the each of the memory cells is configured to store data of five or more bits.

* * * * *